(12) United States Patent
Kousaridas et al.

(10) Patent No.: US 12,452,727 B2
(45) Date of Patent: *Oct. 21, 2025

(54) TECHNIQUES FOR QUALITY OF SERVICE NEGOTIATION

(71) Applicant: HUAWEI TECHNOLOGIES CO., LTD., Shenzhen (CN)

(72) Inventors: Apostolos Kousaridas, Munich (DE); Karthikeyan Ganesan, Munich (DE); Mate Boban, Munich (DE); Malte Schellmann, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/518,221

(22) Filed: Nov. 22, 2023

(65) Prior Publication Data
US 2024/0089790 A1    Mar. 14, 2024

Related U.S. Application Data

(63) Continuation of application No. 17/698,778, filed on Mar. 18, 2022, now Pat. No. 11,856,444, which is a
(Continued)

(51) Int. Cl.
*H04W 28/02* (2009.01)
*H04W 36/00* (2009.01)
(Continued)

(52) U.S. Cl.
CPC ... *H04W 28/0268* (2013.01); *H04W 36/0044* (2013.01); *H04W 68/005* (2013.01); *H04W 72/1263* (2013.01); *H04W 76/27* (2018.02)

(58) Field of Classification Search
CPC .......... H04W 4/40; H04W 4/44; H04W 4/46; H04W 28/00; H04W 28/16; H04W 28/24;
(Continued)

(56) References Cited

U.S. PATENT DOCUMENTS 6,654,808 B1 * 11/2003 Chuah ................... H04L 69/16
709/227
6,738,819 B1    5/2004 Li et al.
(Continued)

FOREIGN PATENT DOCUMENTS

KR         101034861 B1    5/2011
WO       2008008145 A2    1/2008
(Continued)

OTHER PUBLICATIONS

"3rd Generation Partnership Project; Technical Specification Group Services and System Aspects; Study on enhancement of 3GPP Support for 5G V2X Services (Release 15)," 3GPP TR 22.886 V15.1.0, pp. 1-58, 3rd Generation Partnership Project, Valbonne, France (Mar. 2017).
(Continued)

*Primary Examiner* — Robert C Scheibel
(74) *Attorney, Agent, or Firm* — Leydig, Voit & Mayer, Ltd.

(57) ABSTRACT

The disclosure relates to a mobile device, in particular a vehicle, or an application server, wherein the mobile device or the application server comprise: a processor, configured to: receive a notification from a network entity, in particular a base station, wherein the notification comprises information about available Quality of Service, QoS, and transmit a confirmation message to the network entity informing the network entity about an acceptance of the notified QoS. The disclosure further relates to a network entity, comprising: a network entity controller, configured to: transmit a notification to a mobile device, in particular a vehicle, or an application server, wherein the notification comprises information about available Quality of Service, QoS, and receive a confirmation message from the mobile device or the
(Continued)

application server informing about an acceptance of the notified QoS.

17 Claims, 16 Drawing Sheets

Related U.S. Application Data continuation of application No. 16/859,626, filed on Apr. 27, 2020, now Pat. No. 11,284,289, which is a continuation of application No. PCT/EP2017/077465, filed on Oct. 26, 2017.

(51) Int. Cl.
*H04W 68/00* (2009.01)
*H04W 72/1263* (2023.01)
*H04W 76/27* (2018.01)

(58) Field of Classification Search
CPC ......... H04W 28/0268; H04W 36/0044; H04W 68/005; H04W 72/1263; H04W 76/27
See application file for complete search history.

(56) References Cited

U.S. PATENT DOCUMENTS

| | | | |
|---|---|---|---|
| 6,973,622 | B1 | 12/2005 | Rappaport et al. |
| 7,957,738 | B2 | 6/2011 | Rey et al. |
| 8,780,814 | B2 | 7/2014 | Song et al. |
| 11,284,289 | B2 * | 3/2022 | Kousaridas ....... H04W 36/0044 |
| 11,576,079 | B2 | 2/2023 | Qiao et al. |
| 11,856,444 | B2 * | 12/2023 | Kousaridas ....... H04W 28/0268 |
| 2004/0249887 | A1 | 12/2004 | Garcia-Martin et al. |
| 2006/0227728 | A1 | 10/2006 | Baumann |
| 2006/0245386 | A1 | 11/2006 | Hu |
| 2014/0023013 | A1 * | 1/2014 | Lee .................. H04W 48/18 370/329 |
| 2015/0110009 | A1 * | 4/2015 | Berzin .............. H04L 45/302 370/329 |
| 2015/0350918 | A1 * | 12/2015 | Rashid .............. H04W 72/20 370/329 |
| 2016/0100353 | A1 | 4/2016 | Gleixner |
| 2018/0139593 | A1 | 5/2018 | Chun et al. |
| 2019/0223054 | A1 * | 7/2019 | Nunna .............. H04L 47/283 |
| 2020/0120458 | A1 * | 4/2020 | Aldana ............. H04W 12/069 |

FOREIGN PATENT DOCUMENTS

| | | | |
|---|---|---|---|
| WO | 2010139105 A1 | 12/2010 | |
| WO | WO-2015193727 A1 * | 12/2015 | ........... H04W 4/021 |
| WO | 2016200184 A1 | 12/2016 | |
| WO | 2017001634 A1 | 1/2017 | |

OTHER PUBLICATIONS

"Perspectives on Vertical Industries and Implications for 5G," Version: 1.0, NGMN P1 WS#2 Verticals, NGMN Board, total 29 pages (Jun. 10, 2016).

"3rd Generation Partnership Project; Technical Specification Group Services and System Aspects; Enhancement of 3GPP support for V2X scenarios; Stage 1 (Release 15)," 3GPP TS 22.186 V15.0.0, pp. 1-16, 3rd Generation Partnership Project, Valbonne, France (Mar. 2017).

"3rd Generation Partnership Project; Technical Specification Group Core Network and Terminals; Non-Access-Stratum (NAS) protocol for Evolved Packet System (EPS); Stage 3 (Release 14)," 3GPP TS 24.301 V14.4.0, pp. 1-486, 3rd Generation Partnership Project, Valbonne, France (Jun. 2017).

"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331 V14.2.2, pp. 1-721, 3rd Generation Partnership Project, Valbonne, France (Apr. 2017).

"3rd Generation Partnership Project; Technical Specification Group Radio Access Network; Study on New Radio Access Technology; Radio Interface Protocol Aspects (Release 14)," 3GPP TR 38.804 V14.0.0, pp. 1-57, 3rd Generation Partnership Project, Valbonne, France (Mar. 2017).

Charalampos et al., "Advances in QoS/E Characterization and Prediction for Next Generation Mobile Communication Systems," Handbook of Research on Next Generation Mobile Communication Systems, Ed. A.D. Panagopoulos, IGI Global, total 27 pages (2015).

Epstein, "Predictive QoS-Based Admission Control for Multiclass Traffic in Cellular Wireless Networks," IEEE Journal on Selected Areas in Communications, vol. 18, No. 3, pp. 523-534, Institute of Electrical and Electronics Engineers, New York, New York (Mar. 2000).

Taleb et al., "QoS/QoE Predictions-based Admission Control for Femto Communications," IEEE ICC 2012—Wireless Networks Symposium, pp. 5146-5150, Institute of Electrical and Electronics Engineers, New York, New York (2012).

Wac et al., "Quality of Service Predictions Service: QoS Support for Proactive Mobile Applications and Services," https://citeseerx.ist.psu.edu/viewdoc/download?doi=10.1.1.399.9079&rep=rep1&type=pdf, total 22 pages (2002).

"3rd Generation Partnership Project; Technical Specification Group Services and System Aspects; System Architecture for the 5G System; Stage 2 (Release 15)," 3GPP TS 23.501 V1 .0.0, pp. 1-145, 3rd Generation Partnership Project, Valbonne, France (Jun. 2017).

* cited by examiner

TECHNIQUES FOR QUALITY OF SERVICE NEGOTIATION

CROSS-REFERENCE TO RELATED APPLICATIONS his application is a continuation of U.S. patent application Ser. No. 17/698,778, filed on Mar. 18, 2022, now U.S. Pat. No. 11,856,444, which is a continuation of U.S. patent application Ser. No. 16/859,626, filed on Apr. 27, 2020, now U.S. Pat. No. 11,284,289, which is a continuation of International Application No. PCT/EP2017/077465, filed on Oct. 26, 2017. All of the afore-mentioned patent applications are hereby incorporated by reference in their entireties.

TECHNICAL FIELD

The present disclosure relates to techniques for Quality of Service (QoS) negotiation. In particular, the disclosure relates to a mobile device, e.g. a vehicle, or an application server negotiating the QoS with a network entity, to a network entity negotiating the QoS with a mobile device or an application server and to an application for the mobile device or the application server negotiating the QoS. The disclosure further relates to a method for negotiating a QoS.

BACKGROUND

In mobile communications, use cases related to vehicle-to-anything (V2X) (e.g. platooning, advanced driving, cooperative perception) can be implemented using different QoS classes (or degrees of Key Performance Indicators, KPIs—e.g., latency, reliability levels . . . ), as it is presented in 3GPP TS 22.186 V15.0.0: Service requirements for enhanced V2X scenarios (Release 15), March 2017. The different QoS classes will affect the (self-) driving behavior (e.g., speed of vehicles, distance among vehicles).

The network and vehicles/UEs can setup and dynamically modify the QoS bearers in a cooperative manner, considering network conditions and impact on driving behavior. For instance, a platooning application can modify the distance among platoon vehicles according to the QoS that the network can support for the communication among the members of the platoon at the specific period of time. The higher the QoS that the network can provide the denser the platoon can be (i.e., shorter distance among the vehicles that form the platoon), as shown in FIG. 2.

However the existing schemes for determining QoS classes between UEs and the network during bearers' establishment (or bearers' update) are slow and not efficient. In addition, there is no early notification scheme from the network to the UEs about QoS changes that can consequently facilitate the "early" modification of the (V2X) application layer, due to the change of network conditions.

SUMMARY

It is the object of the invention to provide efficient techniques for providing faster and safe communication between mobile devices such as vehicles.

In particular it is the object of the invention to enable a faster "negotiation" between a UE (or a group of them) and the Radio Access Network (RAN (BS) or Core Network (CN) entities (e.g., MME in LTE, AMF in 5G)) to establish vehicle-to-vehicle (V2V) radio bearers, whenever the Admission Control is triggered during scenarios such as Connection establishment, New Service/bearer establishment, Handover etc., . . . .

This object is achieved by the features of the independent claims. Further implementation forms are apparent from the dependent claims, the description and the figures.

The disclosure presents solutions to this problem. These solutions reduce the bearer establishment time and provide flexibility to both network and V2X application sides. In particular, solutions to this problem provide an early notification of a UE (or a group of them) for the modification of V2V radio bearers that are already established and used by V2V applications. This will increase the reliability of the system, allowing the V2X application to be notified (feedback) early enough for a modification of a bearer. The latter will allow the V2X application in the vehicles to modify their driving behavior early enough.

The disclosed solutions apply to both direct and indirect V2V (sidelink) communication and uplink/downlink communication.

A basic idea of the invention is the introduction of soft admission control and explicit notification schemes for next available QoS bearer information to UE, during bearer establishment in the following cases: Initial attach (Connection Establishment); Dedicated bearer establishment (in RRC Connected state); Handover. Such a QoS negotiation may include the following messages: Early Notification for modifications of already established Bearers; Reply with a proposals of next available QoS Bearer or List (List of QCI/Priorities); Accept one of proposed Bearers that is described in the Request message.

The solution presented in this disclosure provides the following advantages: Latency can be reduced by reducing the message interaction between the group of vehicles and the network for the RRC establishment of new radio bearers. Consequently, this also reduces the signaling overhead. Explicit notification provided by the network to the group of vehicles about the change in QoS class due to sudden change in radio condition enables smooth vehicle transition to increase/decrease the distance between them before the actual modification of radio bearer. Continuous service provision reduces the service drop rate. The impact of QoS change can be reduced, especially for critical services. Reliability and availability of the future services of connected cars can be increased, due to early notifications of network QoS features, increasing the end-to-end system performance.

The disclosed solution provides additional information on available bearers in the bearer setup and maintenance processes to ease and speed up the connection establishment. Explicit notification schemes for next available QoS bearer information to UE are introduced, in particular during bearer establishment in the following cases: Initial attach (Connection Establishment), Dedicated bearer establishment (in RRC Connected state), Handover. The disclosed solution presents a new method for proactive signaling information exchange, including explicit notification of next available QoS bearer from the network, based on network conditions for the requests received by the vehicles/UEs in the case of a) Early Notification for modifications of already established Bearers; b) Reply with proposals of next available QoS Bearer or List (List of QCI/Priorities); and c) Accept one of proposed Bearers that is described in the Request message.

The disclosed solution presents an extended signaling to support soft bearer request from the vehicle/UE by providing the list/range of QoS classes that can support the target V2X Service. The disclosed solution presents use of periodic or event-triggered reporting by the vehicles or the Intelligent Transportation System (ITS) Server and assessing current network conditions.

In the following, Radio Access Networks (RANs) and Radio Admission Control (RAC) are described with respect to Quality of Service (QoS) requirements. The Radio Admission Control (RAC) algorithm admits or rejects bearer requests for new radio bearers. Admission Control (AC) is not standardized which means LTE Radio Access Network (RANs) will run different AC algorithms. The algorithm in contention situation triggers Radio Bearer Control (RBC) in which case the allocation happens on the basis of the Allocation and Retention Priority (ARP) parameters present along with the bearer request. Each dedicated bearer request contains QoS parameter like ARP, QCI, MBR, GBR etc. ARP contains 3 Mandatory fields: Priority Level, Pre-Emption Capability, Pre-Emption Vulnerability. Priority Level—Range is from 1 to 15 (where 1 is the highest priority). Pre-Emption Capability contains the following conditions: "Shall not trigger pre-emption": cannot preempt other bearers during resource congestion; and "May trigger preemption": can trigger preemption of other bearers during resource congestion. Pre-Emption Vulnerability contains the following conditions: "Not pre-emptable": This bearer cannot be pre-emptable by other bearers; and "Pre-emptable": This bearer can be released during resource congestion by other bearers. Dynamic QoS modification in an established bearer is possible in LTE with BS-modify eps bearer context request. In current systems only hard decisions related to pre-emption are provided, i.e. V-UE does not have extra degree of freedom in negotiating the QoS which is required so that to avoid over provisioning of resources or a rejection. An explicit notification of network conditions is missing.

The solution described in this disclosure presents soft admission control to introduce extra degree of freedom in negotiating the QoS and different notification schemes to enable a faster "negotiation" between a UE (or a group of them) and the Radio Access Network (RAN (BS) or Core Network (CN) entities (e.g., MME in LTE, AMF in 5G)) to establish vehicle-to-vehicle (V2V) radio bearers, whenever the Admission Control is triggered during scenarios such as Connection establishment, New Service/bearer establishment, Handover etc., . . . .

In order to describe the invention in detail, the following terms, abbreviations and notations will be used:

AF: Application Function
AMF: Access and Mobility Function
AS: Access stratum
CN: Core Network
CN-C: Core Network Control Plane
CN-F: Core Network Function
DRB: Dedicated Radio Bearer
ITS: Intelligent Transportation Systems
KPI: Key Performance Indicator
MME: Mobility Management Entity
QoS: Quality of Service
RAN: Radio Access Network
RRC: Radio Resource Control
TS: Technical Specification
UE: User Equipment According to a first aspect, the invention relates to a mobile device, in particular a vehicle, wherein the mobile device comprises: a processor, configured to: receive a notification from a network entity, in particular a base station, wherein the notification comprises information about available Quality of Service, QoS, and transmit a confirmation message to the network entity informing the network entity about an acceptance of the notified QoS.

By using such a mobile device or UE, e.g. a vehicle, a faster "negotiation" between the mobile device (or a group of them) and the Radio Access Network (RAN (BS) or Core Network (CN) entities (e.g., MME in LTE, AMF in 5G)) can be enabled. Hence, vehicle-to-vehicle (V2V) radio bearers can be established whenever the Admission Control is triggered, e.g. during scenarios such as Connection establishment, New Service/bearer establishment, Handover etc. This results in faster and safe communication between mobile devices.

In an exemplary implementation form of the mobile device, the mobile device is configured to send a notification message to indicate to an application the available QoS.

This provides the advantage that the application running on the mobile device has all necessary information for ensuring safe communication.

In an exemplary implementation form of the mobile device, the mobile device is configured to receive from an application a notification on a selected QoS.

The notification will allow the V2X application in the vehicles to modify their driving behavior early enough.

In an exemplary implementation form of the mobile device, the processor is configured to receive the notification during an initial attachment, a dedicated bearer establishment or a handover phase of a bearer establishment, in particular radio bearer.

This provides the advantage that latency can be reduced by reducing the message interaction between the group of vehicles and the network for the RRC establishment of new radio bearers. Consequently, this also reduces the signaling overhead.

In an exemplary implementation form of the mobile device, the processor is configured to transmit a connection request message to the network entity, the connection request message comprising a specific QoS class, wherein the QoS class is a specific QoS level from a set and/or list of QoS levels.

This provides the advantage that the network is informed about specific requirements such as specific QoS classes required by the mobile device.

In an exemplary implementation form of the mobile device, the connection request message comprises a list of candidate QoS classes; and in particular the notification comprises at least one QoS class from the list of candidate QoS classes.

This provides the advantage that the network has the flexibility to choose between the QoS classes from the list.

In an exemplary implementation form of the mobile device, the notification comprises information about available resources supporting another QoS class, in particular a next available QoS class, in particular if the available resources do not support the specific QoS class.

This provides the advantage that the mobile device is informed about alternative QoS classes and can check if one of these QoS classed may fulfill its requirements. This provides more flexibility for system design.

In an exemplary implementation form of the mobile device, the information about available QoS within the notification comprises a list of available QoS classes and in particular mapping of these QoS classes to available resources.

This provides the advantage that the mobile device is informed about available resources and can react by selecting one of these resources.

In an exemplary implementation form of the mobile device, the notification from the network entity is received periodically or event-triggered, in particular triggered by a request of the mobile device.

This provides the advantage that flexible actions can be implemented.

In an exemplary implementation form of the mobile device, the processor is configured to periodically report information, in particular location, mobility information, radio conditions, application status of the mobile device.

This provides the advantage that the network can collect all necessary information and make them available to other devices in the network for improving communication.

According to a second aspect, the invention relates to an application server, wherein the application server comprises: a processor, configured to: receive a notification from a network entity, in particular a base station, wherein the notification comprises information about available Quality of Service, QoS, and transmit a confirmation message to the network entity informing the network entity about an acceptance of the notified QoS.

By using such an application server, a faster "negotiation" between the mobile device (or a group of them) and the Radio Access Network (RAN (BS) or Core Network (CN) entities (e.g., MME in LTE, AMF in 5G)) can be enabled. Hence, vehicle-to-vehicle (V2V) radio bearers can be established whenever the Admission Control is triggered, e.g. during scenarios such as Connection establishment, New Service/bearer establishment, Handover etc. This results in faster and safe communication between mobile devices.

In an exemplary implementation form of the application server, the application server is configured to send a notification message to indicate to an application the available QoS.

This provides the advantage that the application running on the application server has all necessary information for ensuring safe communication.

In an exemplary implementation form of the application server, the application server is configured to receive from an application a notification on a selected QoS.

The notification will allow the V2X application in the vehicles to modify their driving behavior early enough.

In an exemplary implementation form of the application server, the processor is configured to receive the notification during an initial attachment, a dedicated bearer establishment or a handover phase of a bearer establishment, in particular radio bearer.

This provides the advantage that latency can be reduced by reducing the message interaction between the group of vehicles and the network for the RRC establishment of new radio bearers. Consequently, this also reduces the signaling overhead.

In an exemplary implementation form of the application server, the processor is configured to transmit a connection request message to the network entity, the connection request message comprising a specific QoS class, wherein the QoS class is a specific QoS level from a set and/or list of QoS levels.

This provides the advantage that the network is informed about specific requirements such as specific QoS classes required by the mobile device.

In an exemplary implementation form of the application server, the connection request message comprises a list of candidate QoS classes; and in particular the notification comprises at least one QoS class from the list of candidate QoS classes.

This provides the advantage that the network has the flexibility to choose between the QoS classes from the list.

In an exemplary implementation form of the application server, the notification comprises information about available resources supporting another QoS class, in particular a next available QoS class, in particular if the available resources do not support the specific QoS class.

This provides the advantage that the application server is informed about alternative QoS classes and can check if one of these QoS classed may fulfill its requirements. This provides more flexibility for system design.

In an exemplary implementation form of the application server, the information about available QoS within the notification comprises a list of available QoS classes and in particular mapping of these QoS classes to available resources.

This provides the advantage that the application server is informed about available resources and can react by selecting one of these resources.

In an exemplary implementation form of the application server, the notification from the network entity is received periodically or event-triggered, in particular triggered by a request of the mobile device.

This provides the advantage that flexible actions can be implemented.

In an exemplary implementation form of the application server, the processor is configured to periodically report information, in particular location, mobility information, radio conditions, application status of the mobile device.

This provides the advantage that the network can collect all necessary information and make them available to other devices in the network for improving communication.

According to a third aspect, the invention relates to a network entity, comprising: a network entity controller, configured to: transmit a notification to a mobile device, in particular a vehicle, or an application server, wherein the notification comprises information about available Quality of Service, QoS, and receive a confirmation message from the mobile device or the application server informing about an acceptance of the notified QoS.

By using such a network entity, a faster "negotiation" between the mobile device (or a group of them) and the network entity, e.g. the Radio Access Network (RAN (BS) or Core Network (CN) entities (e.g., MME in LTE, AMF in 5G)) can be enabled. Hence, vehicle-to-vehicle (V2V) radio bearers can be established whenever the Admission Control is triggered, e.g. during scenarios such as Connection establishment, New Service/bearer establishment, Handover etc. This results in faster and safe communication between mobile devices.

In an exemplary implementation form of the network entity, the network entity controller is configured to transmit the notification upon request and/or pro-actively, in particular based on a prediction of a change in radio conditions.

This provides a high degree of flexibility in system design.

In an exemplary implementation form of the network entity, the network entity controller is configured to allocate resources related to a specific QoS to the mobile device or the application server upon acceptance of the notified QoS.

This provides the advantage that the mobile device is informed about available resources and can influence resource allocation by the network.

In an exemplary implementation form of the network entity, the network entity controller is configured: to transmit the notification to a group of vehicles or an application server, and to allocate the resources related to the specific QoS to the group of vehicles if the network entity controller receives respective confirmation messages from all vehicles of the group of vehicles.

This will increase the reliability of the system, allowing the group of vehicles to be notified (feedback) early enough for a modification of a bearer. The V2X application in the vehicles will be allowed to modify their driving behavior early enough.

In an exemplary implementation form of the network entity, the network entity controller is configured to monitor the QoS of an established vehicle-to-everything, V2X, service.

This provides the advantage that a real-time QoS is available at the network entity.

According to a fourth aspect, the invention relates to a method for negotiating a Quality of Service, QoS, with a mobile device or an application server, the method comprising: receiving a notification from a network entity, in particular a base station, wherein the notification comprises information about available Quality of Service, QoS; and transmitting a confirmation message to the network entity informing the network entity about an acceptance of the notified QoS.

By using such a method, a faster "negotiation" between the mobile device (or a group of them) and the network entities can be enabled. Hence, vehicle-to-vehicle (V2V) radio bearers can be established whenever the Admission Control is triggered, e.g. during scenarios such as Connection establishment, New Service/bearer establishment, Handover etc. This results in faster and safe communication between mobile devices.

According to a fifth aspect, the invention relates to an application for the mobile device or for the application server according to the first or second aspect of the invention, wherein the application is configured to transmit a request to a mobile device, in particular a vehicle or an application server, wherein the request comprises information about required Quality of Service, QoS, wherein the application is configured to receive a confirmation message about an acceptance of the notified QoS from the mobile device.

This provides the advantage that applications running on the mobile device and/or application server can setup and dynamically modify the QoS bearers in a cooperative manner, considering network conditions and impact on driving behavior. For instance, a platooning application can modify the distance among platoon vehicles according to the QoS that the network can support for the communication among the members of the platoon at the specific period of time. The higher the QoS that the network can provide the denser the platoon can be.

In an exemplary implementation form of the application, the application is configured to receive a notification message that indicates an available QoS.

This provides the advantage that the application can optimally control the vehicles, e.g. distance between the members of the platoon based on the information from the notification message.

In an exemplary implementation form of the application, the application is configured to select the available QoS and, in particular, confirm the selection to the mobile device and/or to the application server.

The available QoS can be a single QoS or a list of different QoS-classes. Using a flexible design of QoS classes improves safety.

In an exemplary implementation form of the application, the application is configured to receive a single available QoS or a list of available QoS from a mobile device, in particular a vehicle, or from an application server; and the application is configured to transmit a response to the mobile device or the application server to approve the single available QoS or to select one QoS from the list of available QoS.

This provides the advantage that the application has the flexibility to choose between the QoS classes from the list.

In an exemplary implementation form of the application, the application is configured to transmit the request based on information about a target communication service of the mobile device.

This provides the advantage that the application can be tailored according to specific requirements.

In an exemplary implementation form of the application, the target communication service is related to a group of vehicles.

This provides the advantage that various traffic scenarios such as platooning, advanced driving, cooperative perception, etc. can be safely implemented.

In an exemplary implementation form of the application, the target communication service comprises a vehicle-to-everything, V2X, service, in particular one of the services: platooning, cooperative collision avoidance, cooperative sensing.

This provides the advantage that the application can be flexibly applied for different applications.

In an exemplary implementation form of the application, the request comprises a list of candidate QoS.

This provides the advantage that the application can select from the list of candidate QoS.

In the following, relevant aspects of the invention are highlighted:

A method for explicit notification of QoS available from the Base Station to the vehicles during connection establishment.

In the method the signaling is extended to support flexible connection request from the vehicle to the network by providing the range (or list) of QoS that could support the target V2X Service.

In the method early notification messages are sent from the Base Station to the vehicles about next available QoS class (based on some predictions and forecasting) for established bearers, to help vehicles to modify their driving behaviour early enough, based on the QoS class that could be supported (proactive signaling).

New signaling information is introduced about explicit notification of next available QoS bearer information from the Base Station to the Vehicles during bearer establishment: Extend messages in the context of a) Initial attach (RRC Idle to RRC Connected State), d) new Dedicated bearer establishment (MME is involved), c) handover (Explicit notification on next available QoS bearer information between Base Stations).

Extend signaling to support soft bearer request from the vehicle to the network by providing the range (or list) of QoS classes that could support the target V2X Service: Extend Vehicles'-initiated messages in the case of initial attach, new dedicated bearer establishment, or handover; In the case of handover a new type of information is proposed to be added in the measurement report together the List of (candidate) QoS level that the UE provides to the Base Station in the context of handover event and forwarded also to target Base Stations; Extend MBMS messages to activate bearers and respective RAN messages in the case of a V2X application server-initiated services requests.

Early notification messages are introduced from the Base Station to the vehicles about next available QoS class (based on some predictions and forecasting) for established bearers, to help vehicles to modify their driving behavior early enough, based on the QoS class that can be supported: Periodic or event triggered update notification messages can be provided by the Base Stations or any other RAN entity; Periodic or event-triggered reporting by the vehicles (or an ITS Server) to facilitate the notification messages.

BRIEF DESCRIPTION OF THE DRAWINGS

Further embodiments of the invention will be described with respect to the following figures, in which.

DETAILED DESCRIPTION OF EMBODIMENTS

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The methods and devices described herein may also be implemented in wireless communication networks based on mobile communication standards similar to, e.g., LTE, in particular 4.5G, 5G and beyond. The methods and devices described herein may also be implemented in wireless communication networks, in particular communication networks similar to WiFi communication standards according to IEEE 802.11. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The devices described herein may be configured to transmit and/or receive radio signals. Radio signals may be or may include radio frequency signals radiated by a radio transmitting device (or radio transmitter or sender) with a radio frequency lying in a range of about 3 kHz to 300 GHz.

The devices and systems described herein may include processors, memories and transceivers, i.e. transmitters and/or receivers. In the following description, the term "processor" describes any device that can be utilized for processing specific tasks (or blocks or steps). A processor can be a single processor or a multi-core processor or can include a set of processors or can include means for processing. A processor can process software or firmware or applications etc.

In the following, base stations and User Equipments are described. Examples of a base station may include access nodes, evolved NodeBs (eNBs), gNBs, NodeBs, master eNBs (MeNBs), secondary eNBs (SeNBs), remote radio heads and access points.

Figure 1:
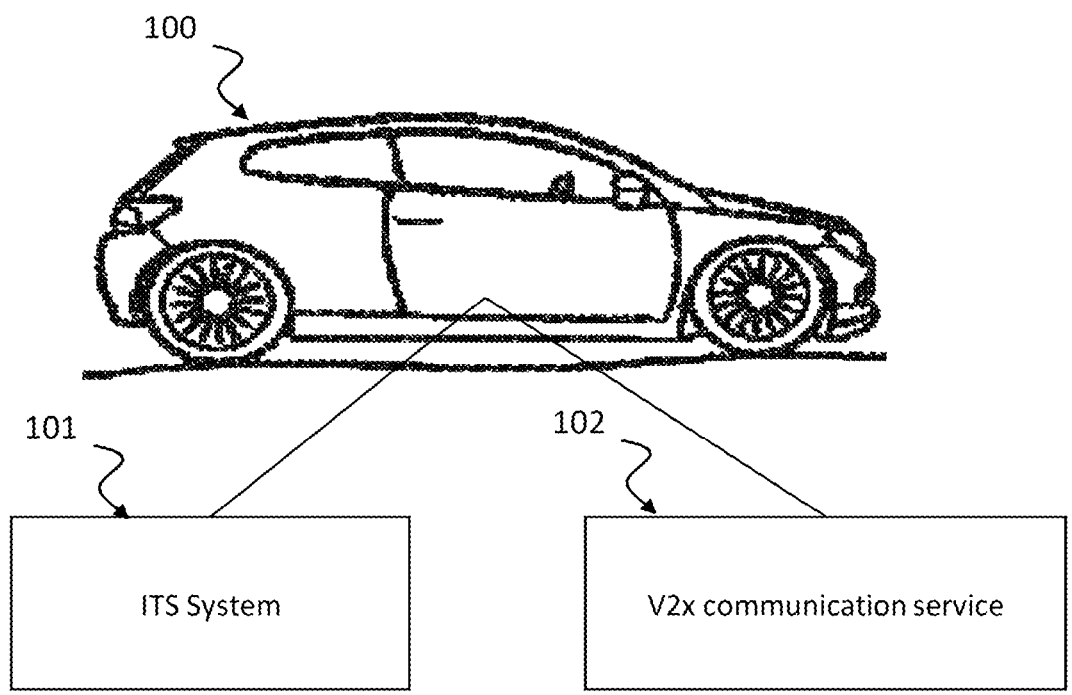
FIG. 1 shows a schematic diagram illustrating a vehicle 100, e.g. a car, with V2X communication system 102 and Intelligent Transportation System (ITS) 101.

FIG. 1 shows a schematic diagram illustrating a vehicle 100, e.g. a car. The vehicle comprises a V2X communication system 102 and an Intelligent Transportation System (ITS) 101. The functionalities of both systems are described in the following.

Figure 2:
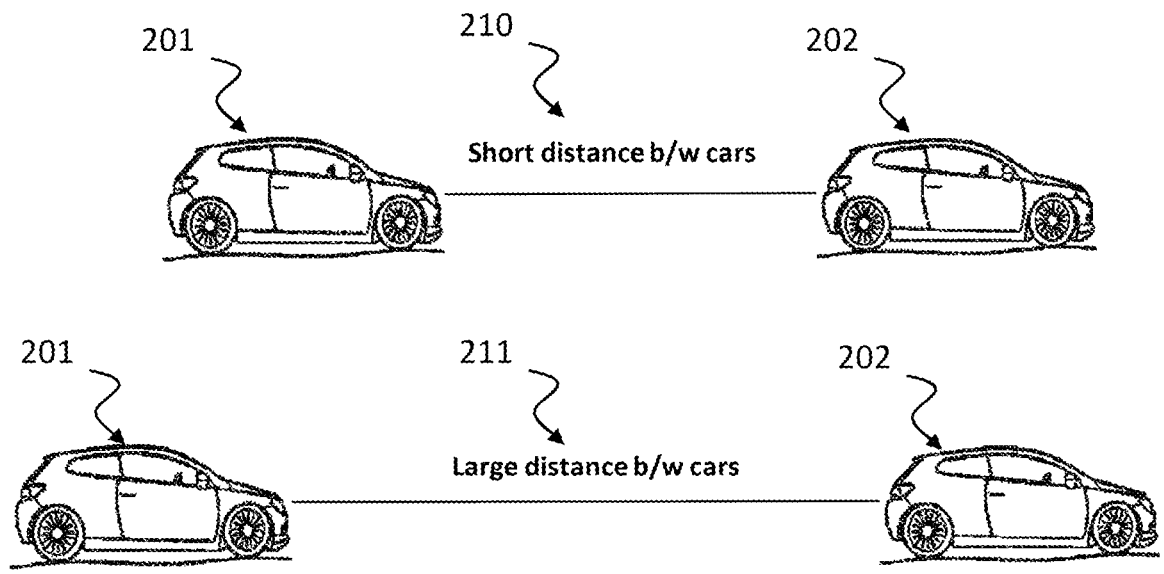
FIG. 2 shows a schematic diagram illustrating two scenarios of the V2X enabled distance control feature: a) short distance 210 between the cars 201, 202 and b) large distance 211 between the cars 201, 202.

FIG. 2 shows a schematic diagram illustrating two scenarios of the V2X enabled distance control feature: a) short distance 210 between the cars 201, 202 and b) large distance 211 between the cars 201, 202.

The network and vehicles/UEs can setup and dynamically modify the QoS bearers in a cooperative manner, considering network conditions and impact on driving behavior. For instance, a platooning application can modify the distance among platoon vehicles (e.g. vehicles 201, 202 shown in FIG. 2), according to the QoS that the network can support for the communication among the members of the platoon at the specific period of time. The higher the QoS that the network can provide the denser the platoon can be. In the upper scenario of FIG. 2 the distance 210 among the vehicles 201, 202 that form the platoon is shorter while in the lower scenario of FIG. 2 the distance 211 among the vehicles 201, 202 that form the platoon is larger.

Figure 3:
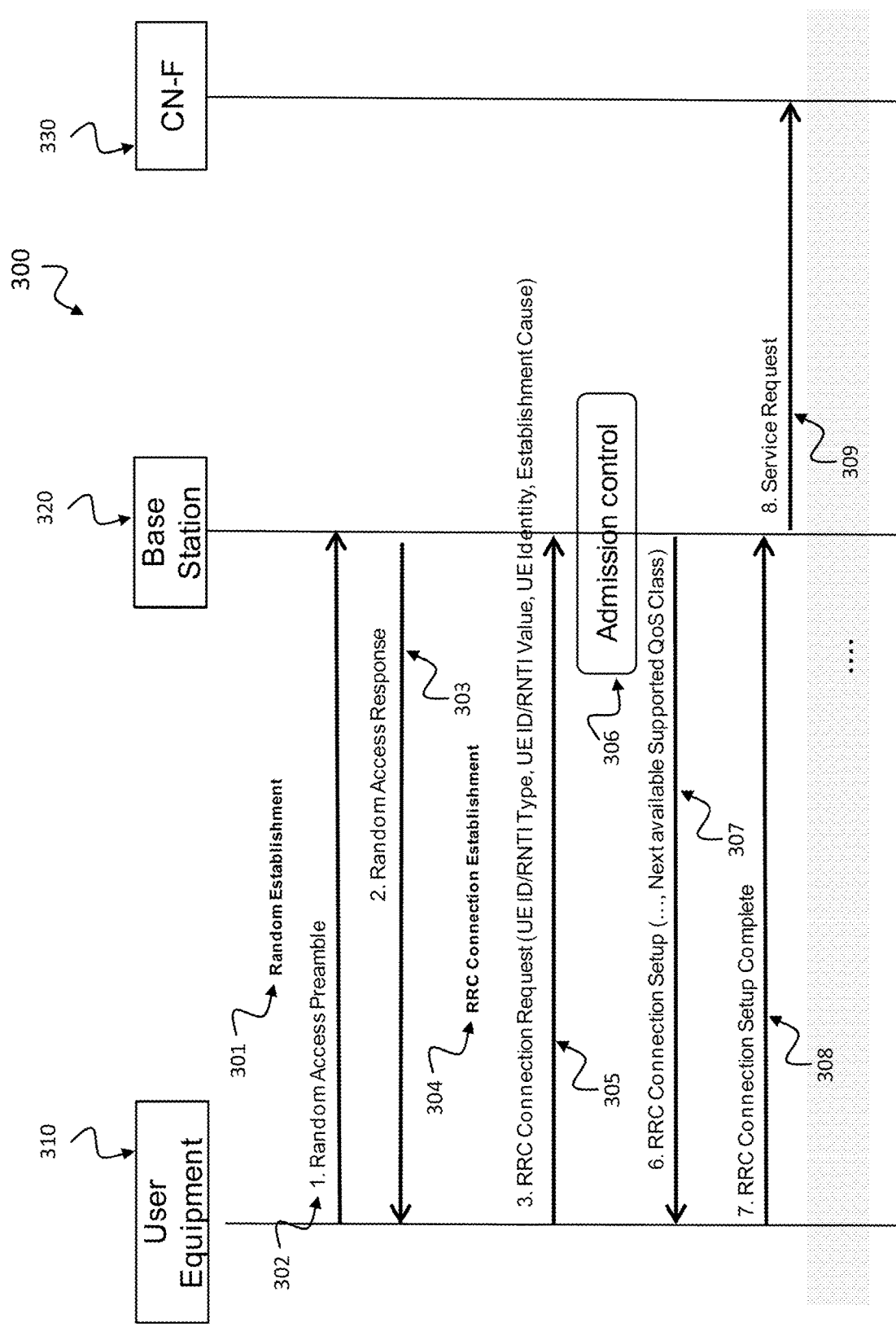
FIG. 3 shows a schematic diagram illustrating an exemplary message sequence chart 300 for explicit notification of next available QoS Bearer in Initial Attachment according to the disclosure.

FIG. 3 shows a schematic diagram illustrating an exemplary message sequence chart 300 for explicit notification of next available QoS Bearer in Initial Attachment according to the disclosure.

FIG. 3 illustrates the message sequence for a new method for proactive signaling information exchange, including explicit notification of next available QoS bearer information between BS 320 and UE 310, e.g. vehicle 100 or 201, 202 as shown in FIGS. 1 and 2, during bearer establishment in-case of initial attach and handover. In Random establishment 301, a random access preamble 302 is transmitted from UE 310 to Base Station 320. BS 320 answers with Random Access Response 303. In RRC Connection Establishment 304, message RRC Connection Request 305 including Establishment cause and other parameters is transmitted from UE 310 to Base Station 320. BS 320 performs admission control 306 and answers with RRC Connection Setup 307 indicating next available supported QoS class. Then UE 310 answers BS 320 with RRC Connection Setup Complete 308 and BS 320 transmits Service Request 309 to CN-F (Core network function) 330, an entity of the network.

The Establishment cause describes the requested Service and consequently the required QoS. This is used by the Admission Control 306 to identify the requested resources.

In case that the BS 320 cannot support the initial request by the vehicle 310 for the requested QoS Class, then based on Admission Control 306 outcomes the BS 320 informs the UE 310 about next available QoS class that can be used to support the specific V2X Service. The Vehicle 310 will assess whether the available QoS class can be used to support the target V2X Service.

Figure 4:
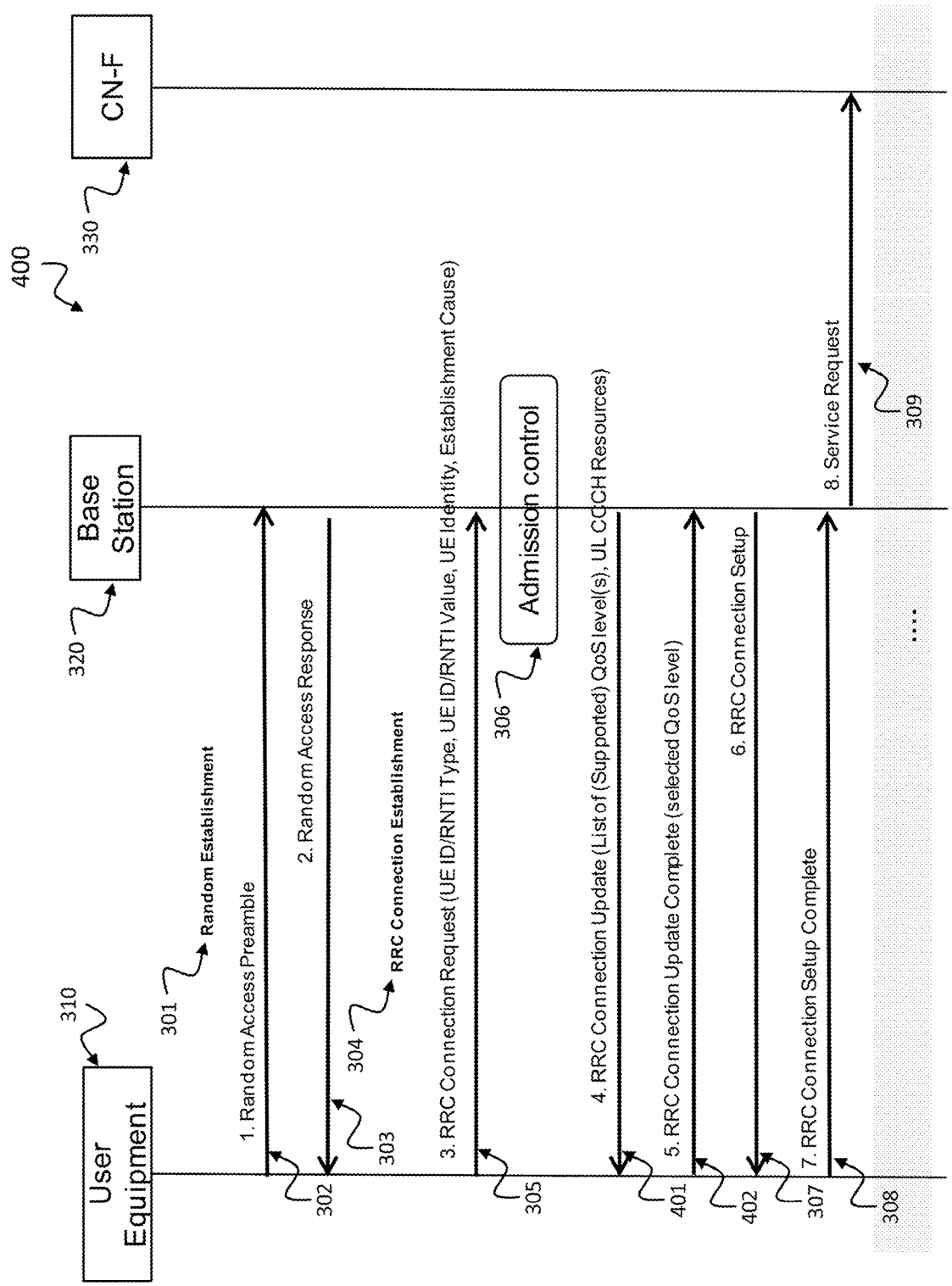
FIG. 4 shows a schematic diagram illustrating an exemplary message sequence chart 400 according to a second option for explicit notification of next available QoS Bearer in Initial Attachment according to the disclosure.

FIG. 4 shows a schematic diagram illustrating an exemplary message sequence chart 400 according to a second option for explicit notification of next available QoS Bearer in Initial Attachment according to the disclosure. In this second option an additional RRC connection update 401, 402 is exchanged by UE 310 and BS 320.

In Random establishment 301, a random access preamble 302 is transmitted from UE 310 to Base Station 320. BS 320 answers with Random Access Response 303. In RRC Connection Establishment 304, message RRC Connection Request 305 including Establishment cause and other parameters is transmitted from UE 310 to Base Station 320. BS 320 performs admission control 306. Depending on the outcome of admission control 306 an RRC Connection Update 401 is transmitted from BS 320 to UE 310 which processes the update and transmits RRC Connection Update Complete 402 to BS 320. Then BS 320 transmits RRC Connection Setup 307 to UE 310 indicating next available supported QoS class. The UE 310 answers BS 320 with RRC Connection Setup Complete 308 and BS 320 transmits Service Request 309 to CN-F (Core network function) 330, an entity of the network.

Figure 5:
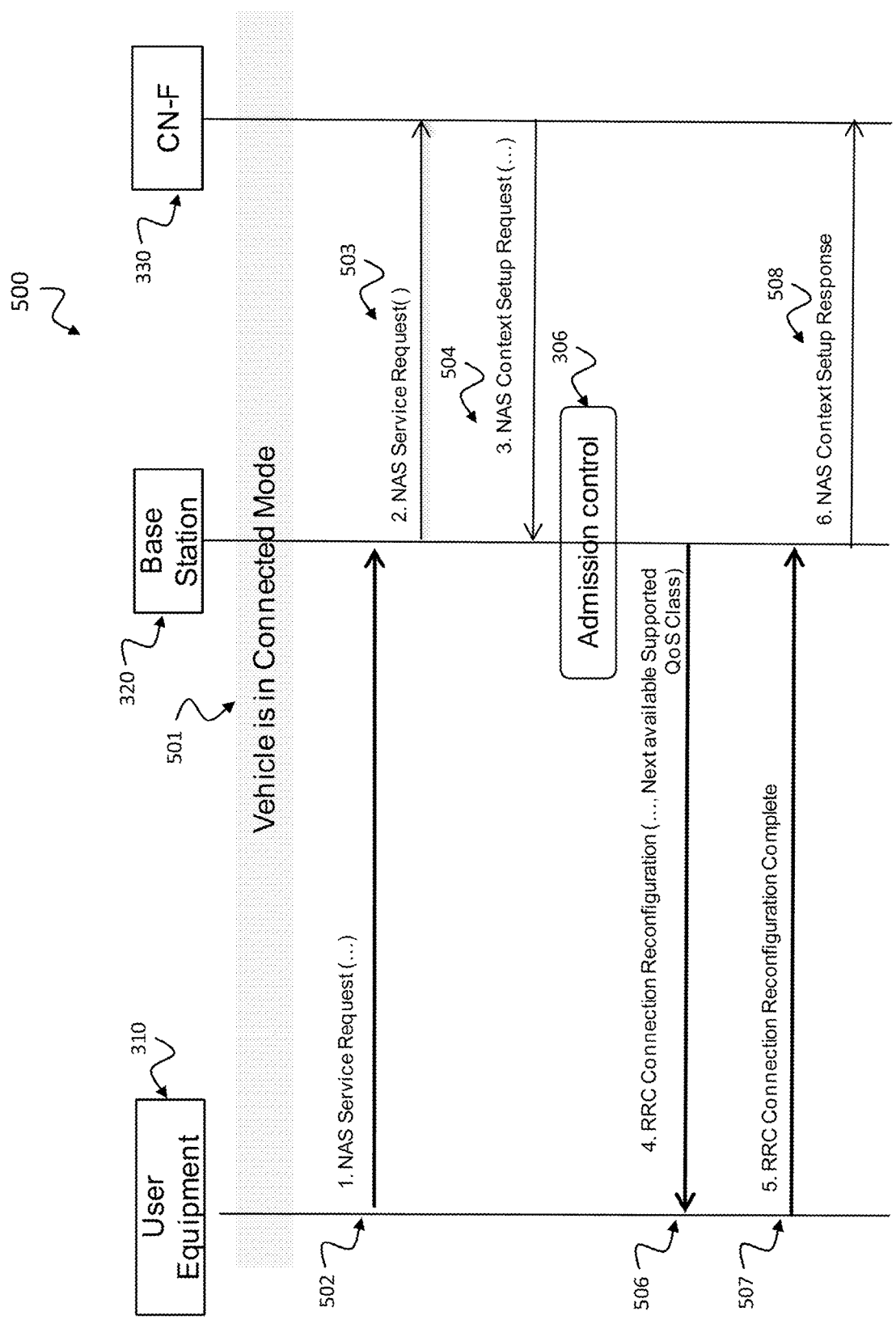
FIG. 5 shows a schematic diagram illustrating an exemplary message sequence chart 500 for explicit notification of next available QoS Bearer in New dedicated Bearer Establishment (vehicle is in RRC Connected state) according to the disclosure.

FIG. 5 shows a schematic diagram illustrating an exemplary message sequence chart 500 for explicit notification of next available QoS Bearer in New dedicated Bearer Establishment (vehicle is in RRC Connected state) according to the disclosure. In this scenario, the network proactively provides a list of alternatives for available QoS classes.

The message sequence chart 500 starts with the vehicle 310 in connection mode 501. UE 310 transmits a NAS Service Request 502 to BS 320. BS 320 forwards the NAS Service Request 503 to CN-F 330. CN-F 330 transmits NAS Context Setup Request 504 to BS 320 which performs admission control 306. Then BS 320 transmits RRC Connection Reconfiguration 506 indicating Next available supported QoS class to UE 310. UE 310 answers BS 320 with RRC Connection Reconfiguration Complete 507 and BS 320 transmits NAS Context Setup Response 508 to CN-F 330.

The BS 320, based on Admission Control 306 outcomes, provides to the UE 310 the list of QoS classes (one or more) that can be allocated/guaranteed (e.g., 25 ms delay, 1% Packet loss, . . . ) to the specific service, based on existing conditions. UL (control plane) resources are allocated to the vehicle 310 for fast response. The Vehicle 310, considering that some V2X Services can be implemented using different degrees of KPIs, selects the appropriate QoS class and informs the BS 320.

The BS 320, having as an input the required V2X service and the QoS classes that can support the specific V2X service, selects the next available QoS class that can support V2X service, considering the network availability and network conditions. The next available supported QoS Class is provided as an input to the "RRC Connection Reconfiguration" message 506. The Vehicle 310 checks whether the proposed "next available supported QoS Classes" can be used. In case that it is accepted then the UE 310 replies with the complete message 507. Otherwise the request 506 is rejected.

Figure 6:
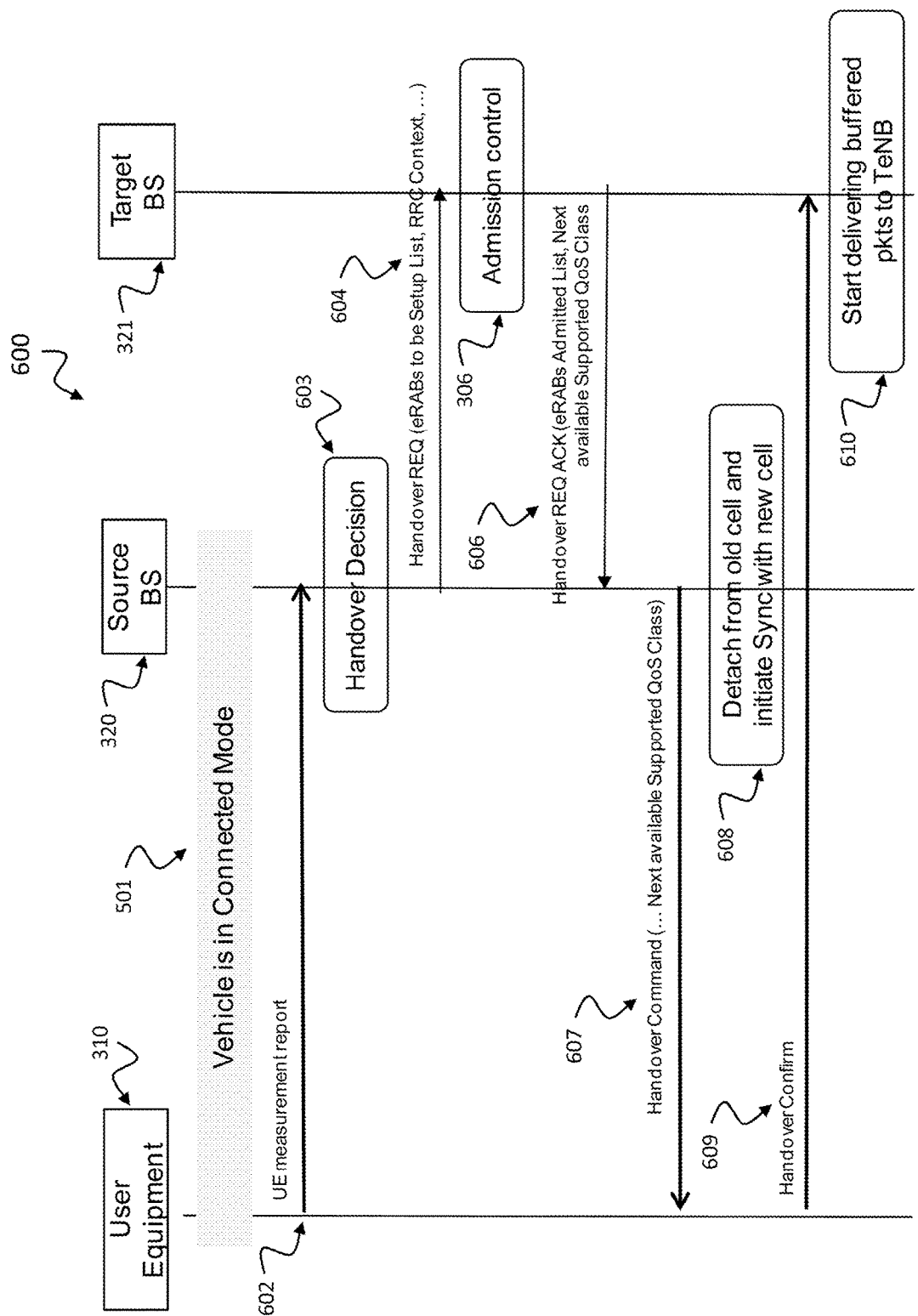
FIG. 6 shows a schematic diagram illustrating an exemplary message sequence chart 600 for explicit notification of next available QoS Bearer in Handover according to the disclosure.

FIG. 6 shows a schematic diagram illustrating an exemplary message sequence chart 600 for explicit notification of next available QoS Bearer in Handover according to the disclosure. The scenario describes an explicit notification on next available QoS bearer information between Base Stations, i.e. source BS 320 and target BS 321.

The message sequence chart 600 starts with the vehicle 310 in connection mode 501. UE 310 transmits a UE measurement report 602 to a source BS, e.g. BS 320 shown in FIGS. 4 and 5. Source BS 320 performs a handover decision 603 and transmits Handover request to target BS 321. Target BS 321 performs admission control 306 and transmits Handover Request Acknowledgement message 606 to source BS 320. Then source BS 320 transmits Handover command 607 to UE to initiate a handover at the UE 310. The source BS 320 detaches from old cell and initiates synchronization with new cell 608. UE 310 transmits Handover Confirm message 609 to target BS 321 which starts delivering buffered packets to target eNodeB 610.

Figure 7:
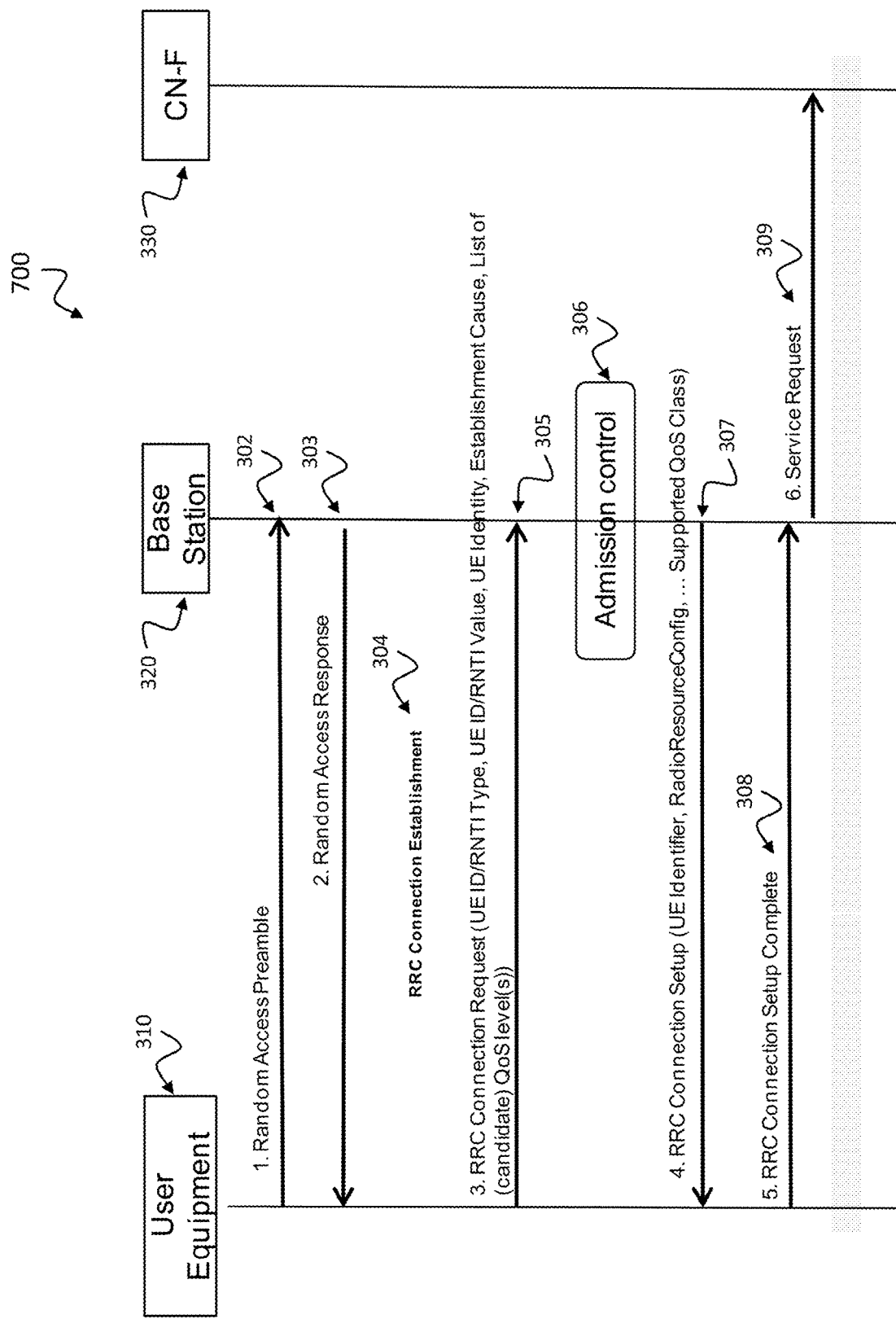
FIG. 7 shows a schematic diagram illustrating an exemplary message sequence chart 700 for Soft Bearer Request in Initial Attachment according to the disclosure.

FIG. 7 shows a schematic diagram illustrating an exemplary message sequence chart 700 for Soft Bearer Request in Initial Attachment according to the disclosure. The scenario describes Soft Bearer Request. UE 310 provides a range of QCI request for the BS 320 to decide, based on the admission control algorithm and BS 320 responds with the best one. A new signaling information about the possible group of QoS request as part of soft radio bearer request for radio admission control during initial attach procedure and handover is presented.

The random access preamble 302 is transmitted from UE 310 to Base Station 320. BS 320 answers with Random Access Response 303. In RRC Connection Establishment 304, message RRC Connection Request 305 including Establishment cause as described above with respect to FIG. 3 and list of candidate QoS levels and other parameters is transmitted from UE 310 to Base Station 320. BS 320 performs admission control 306 and answers with RRC Connection Setup 307 indicating supported QoS class for the list of candidate QoS levels. Then UE 310 answers BS 320 with RRC Connection Setup Complete 308 and BS 320 transmits Service Request 309 to CN-F (Core network function) 330.

Figure 8:
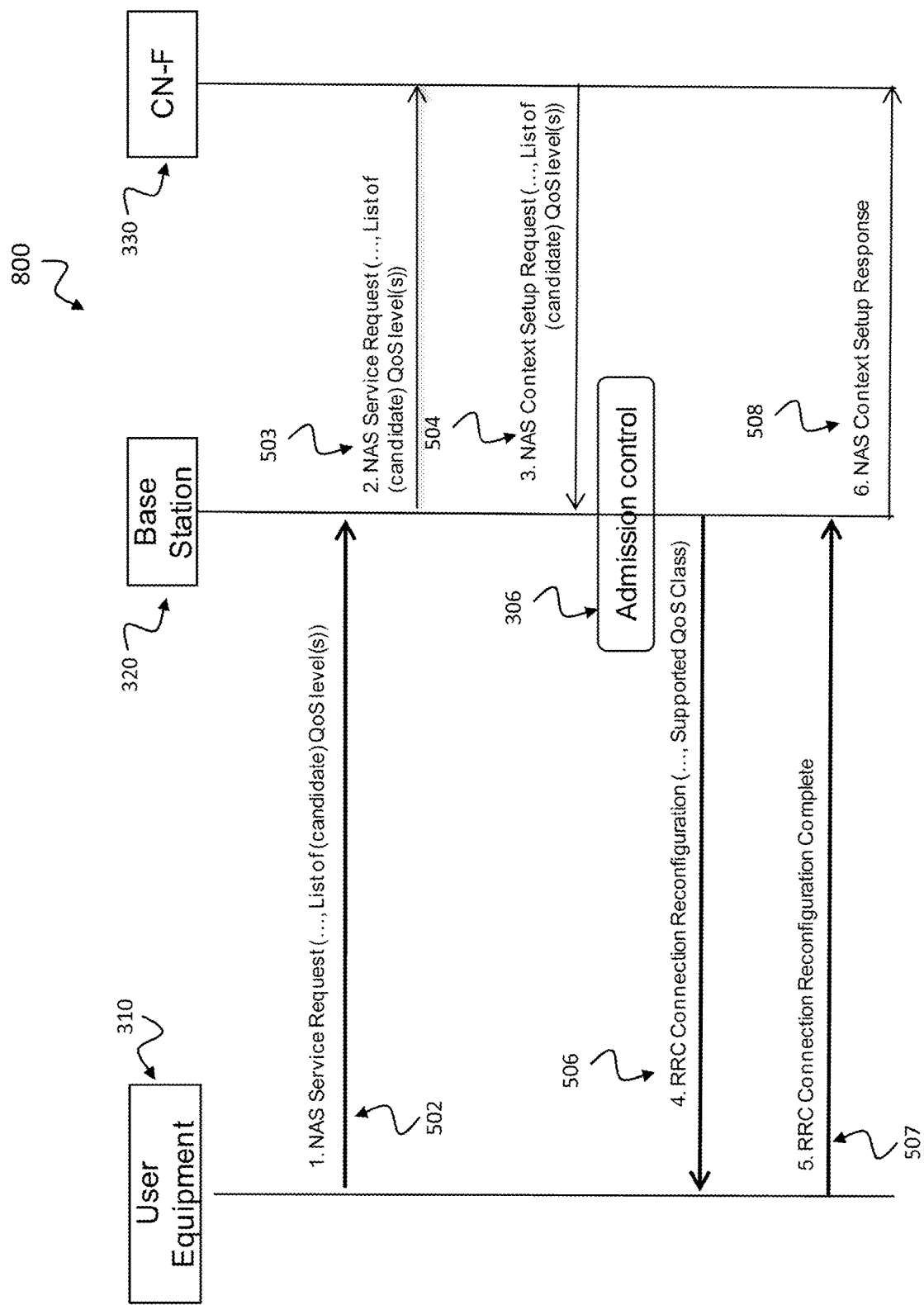
FIG. 8 shows a schematic diagram illustrating an exemplary message sequence chart 800 for Soft Bearer Request in New dedicated Bearer Establishment (vehicle is in RRC Connected state) according to the disclosure.

FIG. 8 shows a schematic diagram illustrating an exemplary message sequence chart 800 for Soft Bearer Request in New dedicated Bearer Establishment (vehicle is in RRC Connected state) according to the disclosure.

UE 310 transmits a NAS Service Request 502 to BS 320. BS 320 forwards the NAS Service Request 503 to CN-F 330. CN-F 330 transmits NAS Context Setup Request 504 to BS 320 which performs admission control 306. Then BS 320 transmits RRC Connection Reconfiguration 506 indicating supported QoS class to UE 310. UE 310 answers BS 320 with RRC Connection Reconfiguration Complete 507 and BS 320 transmits NAS Context Setup Response 508 to CN-F 330.

The Vehicle 310 includes in the "Service Request" 502 the list of QoS levels that can support the target V2X Service. The same information is added in the "Context Setup Request" message 504. The BS 320, having as an input the required V2X service and the QoS classes that can support the specific V2X service, selects the QoS class that can maximize the benefit for the UE 310, considering the network availability and network conditions. The selected QoS Class is provided as an input to the "RRC Connection Reconfiguration" message 506.

Figure 9:
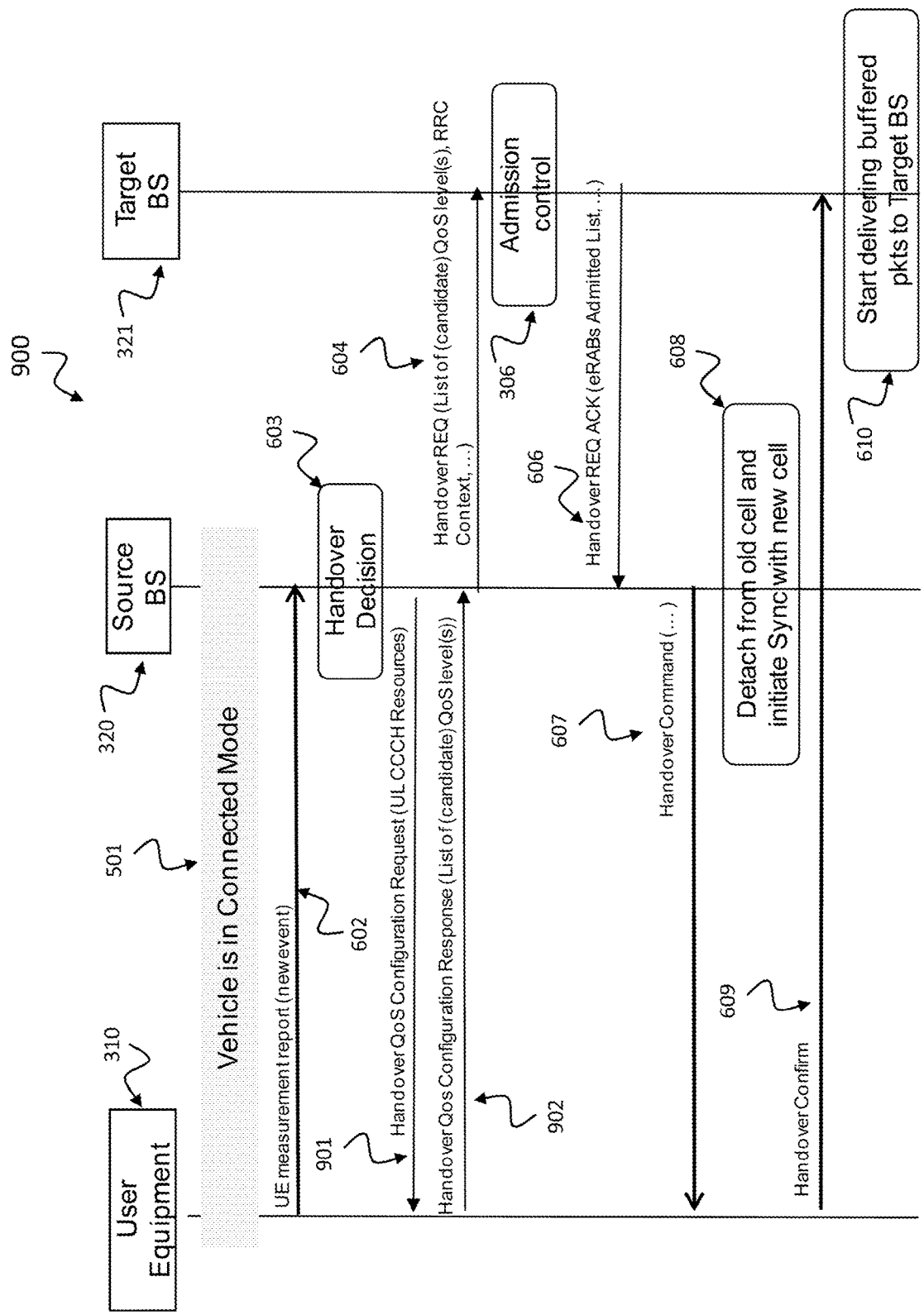
FIG. 9 shows a schematic diagram illustrating an exemplary message sequence chart 900 for Soft Bearer Request in Handover according to the disclosure.

FIG. 9 shows a schematic diagram illustrating an exemplary message sequence chart 900 for Soft Bearer Request in Handover according to the disclosure. The scenario is similar to the scenario of FIG. 6. The source BS 320 however informs UE 310 before transmitting Handover Request to target BS 321.

The message sequence chart 900 starts with the vehicle 310 in connected mode 501. UE 310 transmits a UE measurement report 602 to the source BS, e.g. BS 320 shown in FIGS. 4 and 5. Source BS 320 performs a handover decision 603. Then source BS transmits Handover QoS Configuration Request message 901 to UE 310 and UE 320 answers source BS 320 with Handover QoS Configuration Response 902. Then source BS 320 transmits Handover request 604 to target BS 321. Target BS 321 performs admission control 306 and transmits Handover Request Acknowledgement message 606 to source BS 320. Then source BS 320 transmits Handover command 607 to UE to initiate a handover at the UE 310. The source BS 320 detaches from old cell and initiates synchronization with new cell 608. UE 310 transmits Handover Confirm message 609 to target BS 321 which starts delivering buffered packets to target eNodeB 610.

A new event type is introduced in the Measurement Report. This event will enable/trigger the Source eNB 320 to ask the Vehicle 310 to specify the pool of candidate QoS classes in the case that the neighboring cell becomes x dB better than the serving cell.

Alternatively, the Handover QoS Configuration Response message 902 can be sent just after the UE measurement report 602; without the request 901 of the Source eNB 320.

E-UTRAN Radio Access Bearer (eRABs) to be Setup List includes the selected QoS, class.

Figure 10:
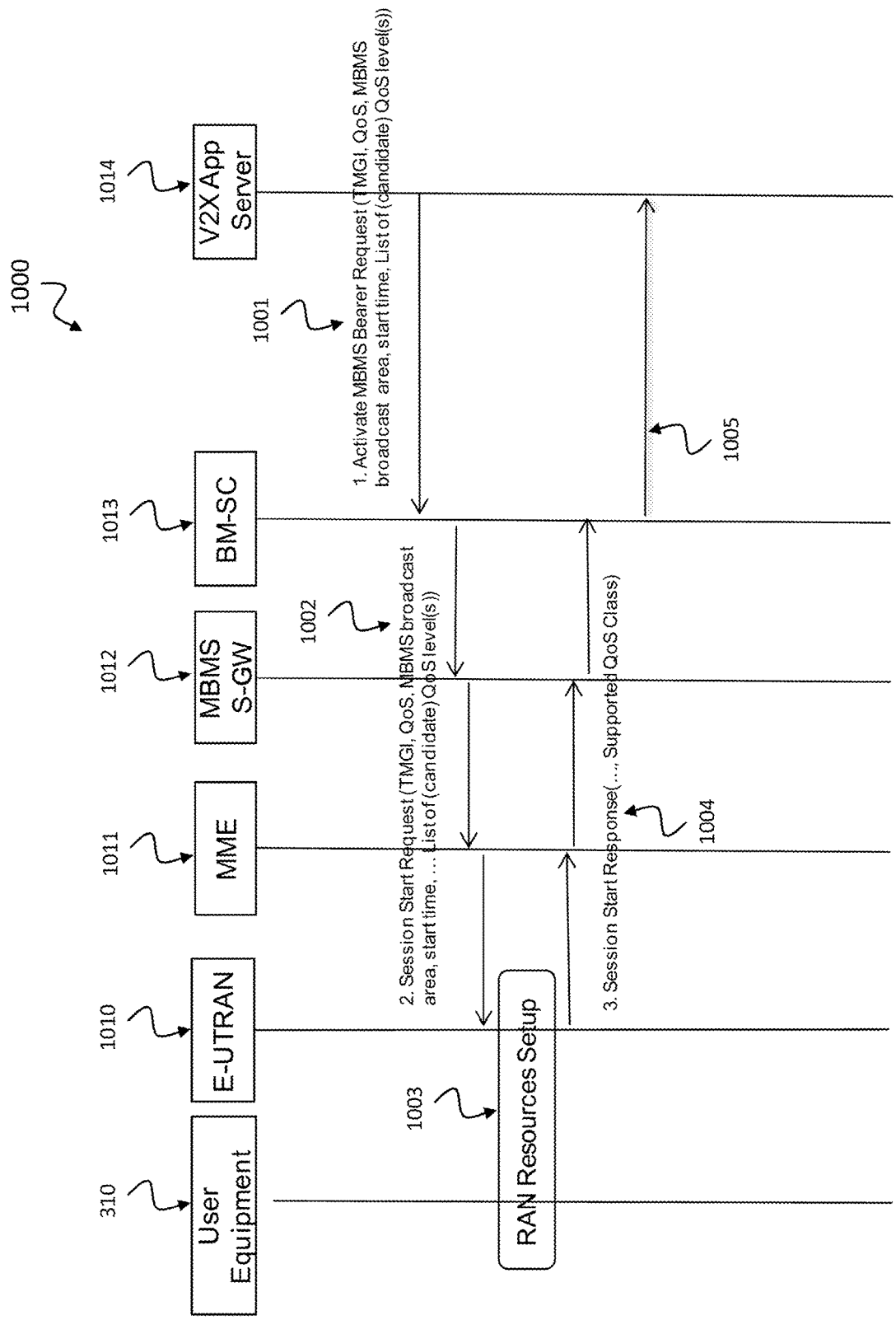
FIG. 10 shows a schematic diagram illustrating an exemplary message sequence chart 1000 for Soft Bearer Request when V2X application server initiated services requests (MBMS case) according to the disclosure.

FIG. 10 shows a schematic diagram illustrating an exemplary message sequence chart 1000 for Soft Bearer Request when V2X application server 1014 initiated services requests (MBMS case) according to the disclosure.

In the scenario of FIG. 10, the V2X application server 1014 initiates Activate MBMS Bearer Request 1001 by transmitting this message to BM-SC 1013. BM-SC 1013 transmits Session Start Request message 1002 to MBMS S-GW 1012 which forwards it to MME 1011 which forwards it to E-UTRAN 1010, e.g. BS 320. E-UTRAN 1010 then performs RAN resources setup 1003 with UE 310. After completing RAN resources setup 1003 E-UTRAN 1010 transmits Session Start Response message 1004 to MME 1011 which forwards it to MBMS S-GW 1012 which forwards it to BM-SC 1013. BM-SC 1013 transmits response message 1005 to V2X application server 1014.

There are several types of session-based V2X services (Platooning, Cooperative Collision Avoidance, Cooperative Sensing . . . ) where a group of vehicles are involved. A notification from the group of involved vehicles is needed before the upgrade to a better QoS level or the downgrade to a lower QoS level, with the "Modify EPS Bearer Context Request" messages and the corresponding responses. This facilitates the vehicles (V2X applications) to modify accordingly and smoothly (group-wise) their driving behavior. The network informs the vehicles that are involved in a specific V2X service about the expected change in the QoS level. Based on the response of the group of vehicles involved in the specific V2X service (e.g., platooning) the network will proceed to the modification of the Bearers.

If the QoS upgrade is not needed or accepted by the involved vehicles (e.g., one of the vehicles in the platoon cannot reduce further the gap) then the Modify EPS Bearer will not be sent to the group of involved vehicles. If the QoS downgrade is not accepted then the release of the session will be requested (or any other application layer modification) to satisfy the QoS levels that network can provide. In any other case the Modify EPS Bearer Context Request message will be sent to all involved vehicles.

The Periodic Check of Resources is based on local radio information and also on periodic reportings from vehicles (e.g., location, application status etc). In the case that the MME 1011 is not involved then the Base Station 1010 can send the "Bearers Update Request" message and the bearers modification will take place by RRC-Reconfiguration.

Figure 11:
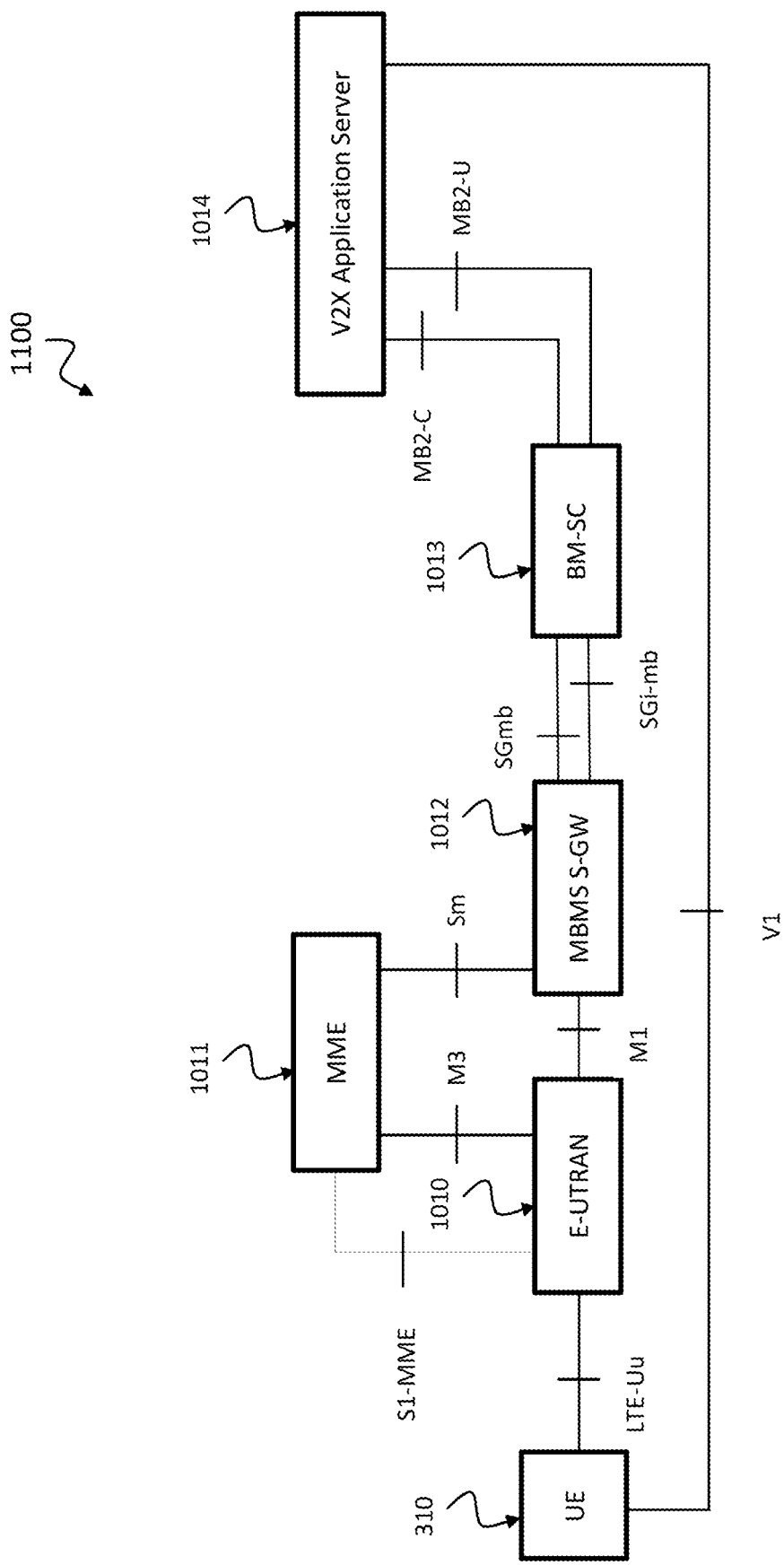
FIG. 11 shows a schematic diagram 1100 illustrating interfaces of the V2X application server according to the disclosure.

FIG. 11 shows a schematic diagram 1100 illustrating interfaces of the V2X application server according to the disclosure. The scenario of Early Notification for Change of Established Bearers (QoS) is described in the following.

The MB2 reference point (BM-SC 1013↔V2X App Server 1014) allows the application to request to activate, deactivate, and modify an MBMS bearer. The V2X Application Server 1014 adds in the Activate MBMS Bearer Request message 1001 (as shown in FIG. 10) the list of QoS levels that can support the target V2X Service. The same information is added in the "Session Start Request" message 1002 (as shown in FIG. 10) that is sent to the E-UTRAN entities 1010 for the establishment of the radio MBMS Bearers. The selected QoS Class is provided to the V2X App Server 1014 in order to modify accordingly the (DL) transmissions from the V2X App Server 1014 to the Vehicles 310.

Figure 12:
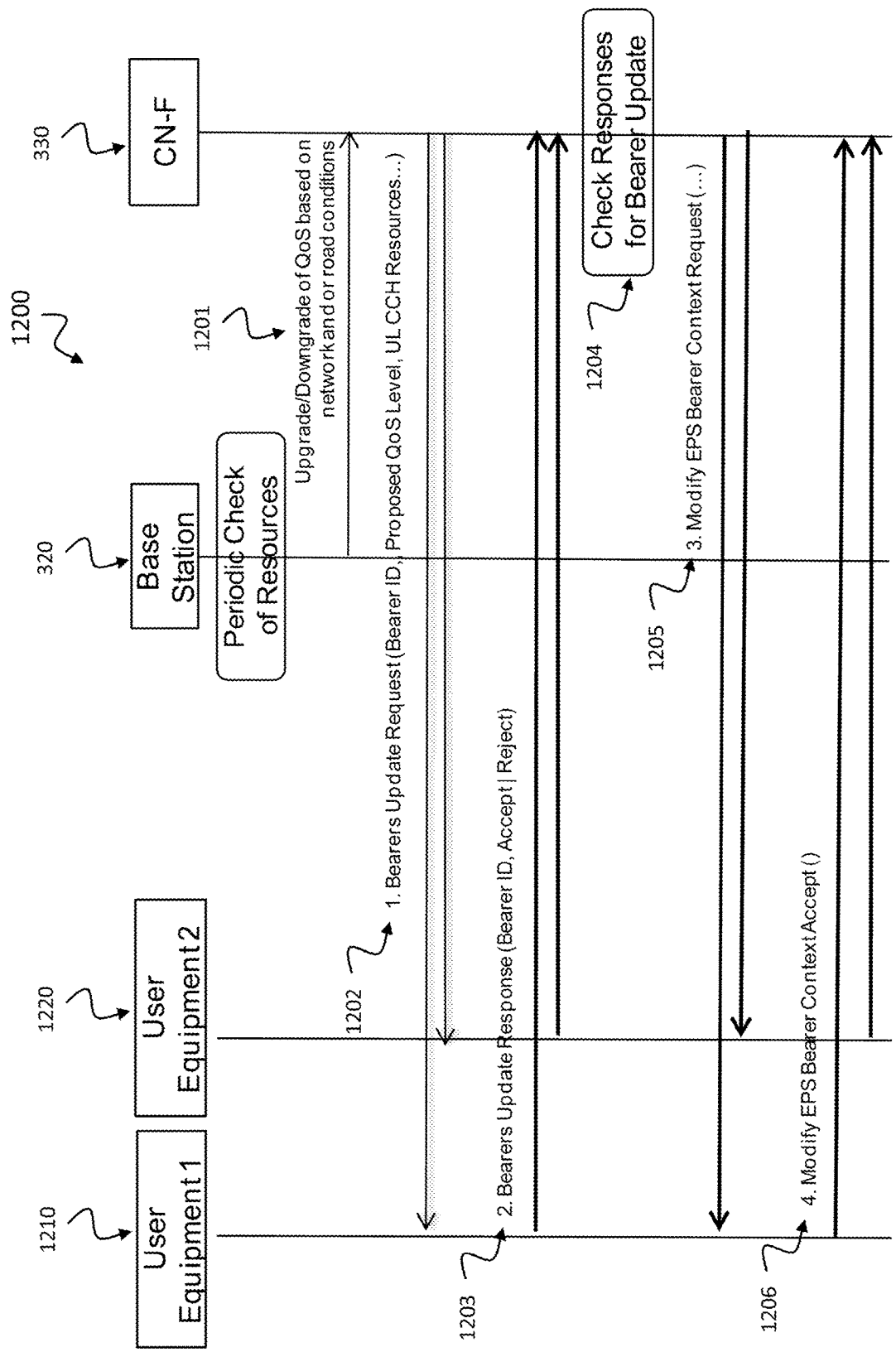
FIG. 12 shows a schematic diagram illustrating an exemplary message sequence chart 1200 for early notification for "Update of Established Bearers" according to the disclosure.

FIG. 12 shows a schematic diagram illustrating an exemplary message sequence chart 1200 for early notification for "Update of Established Bearers" according to the disclosure.

BS 320 starts with periodic check of resources by transmitting Upgrade/Downgrade 1201 of QoS based on network and/or road conditions to CN-F 330. CN-F 330 transmits Bearers Update Request message 1202 to both UEs 1210, 1220. One of UEs 1210, 1220 may be vehicle 320, e.g. 100, 201, 202. These UEs 1210, 1220 answer CN-F 330 with Bearers Update Response message 1203. Then CN-F 330 checks responses for bearer update 1204 and transmits modify EPS bearer Context Request message 1205 to UEs 1210, 1220 which answer CN-F 330 with Modify EPS Bearer Context Accept message 1206.

In the case that there is no "List of (candidate) QoS level(s)" in the Activate MBMS Bearer Request message, then based on the (MBMS) Admission Control outcomes, the next available QoS class (or a list of them) can be proposed to the V2X App Server (via the "Session Start Response" and the "Activate MBMS Bearer Response" messages). The V2X App Server 1014 selects the QoS level that satisfied its application layer needs.

Figure 13:
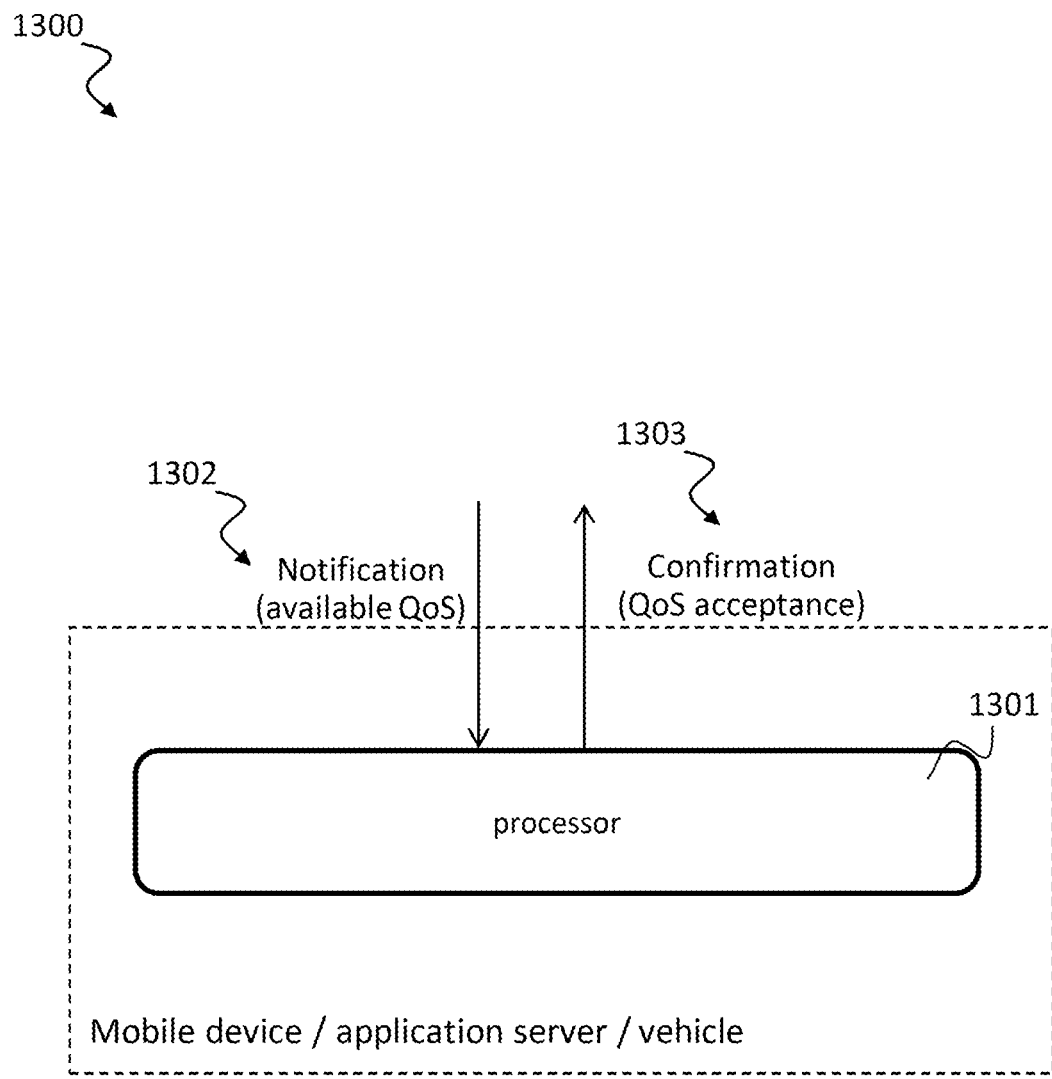
FIG. 13 shows a block diagram illustrating an exemplary mobile device 1300 (or application server or vehicle) negotiating QoS with a network entity according to the disclosure.

FIG. 13 shows a block diagram illustrating an exemplary mobile device 1300, for example a vehicle, or an application server negotiating QoS with a network entity according to the disclosure. The general structure of the device 1300 shown in FIG. 13 is the same for a mobile device and for an application server. It includes a processor 1301 for processing mobile-device specific tasks or application server specific tasks. The functions of the mobile device 1300 and the application server 1300 according to the disclosure are described in the following. The mobile device 1300 can be a vehicle, e.g. a vehicle 100, 201, 202 as described above with respect to FIGS. 1 and 2. The mobile device 1300 can be a user equipment (UE) 310 as described above with respect to FIGS. 3 to 12, e.g. a user equipment 310 arranged in a vehicle 100, 201, 202 as described above with respect to FIGS. 1 and 2.

The processor 1301 is configured to receive a notification 1302 from a network entity, e.g. a network entity 1400 as described below with respect to FIG. 14. The network entity may be a base station, e.g. a base station 320, 321 as described above with respect to FIGS. 3 to 12. The notification 1302 comprises information about available Quality of Service, QoS, e.g. as described above with respect to FIGS. 3 to 12. The processor 1301 is configured to transmit a confirmation message 1303 to the network entity 1400, 320, 321 informing the network entity about an acceptance of the notified QoS.

The mobile device 1300, 310 or the application server 1300, 1014 may send a notification message to indicate to an application the available QoS, e.g. to an application 1500 as described below with respect to FIG. 15. The application 1500 may run on a mobile device 1300 or on an application server 1300. The mobile device or the application server may receive from an application 1500 a notification on a selected QoS.

The processor 1301 may receive the notification 1302 during an initial attachment, a dedicated bearer establishment or a handover phase of a bearer establishment, in particular radio bearer, e.g. as described above with respect to FIGS. 3 to 12. The processor 1301 may transmit a connection request message to the network entity 1400. The connection request message may comprise a specific QoS class. The QoS class may be a specific QoS level from a set and/or list of QoS levels.

The connection request message may comprise a list of candidate QoS classes. The notification 1302 may for example comprise at least one QoS class from the list of candidate QoS classes. The notification 1302 may comprise information about available resources supporting another QoS class, in particular a next available QoS class, in particular if the available resources do not support the specific QoS class.

The information about available QoS within the notification 1302 may comprise a list of available QoS classes and in particular mapping of these QoS classes to available resources. The notification 1302 from the network entity may be received periodically or event-triggered, in particular triggered by a request of the mobile device 1300, 310, e.g. as described above with respect to FIGS. 3 to 12. The processor 1301 may be configured to periodically report information, in particular location, mobility information, radio conditions, application status of the mobile device.

Figure 14:
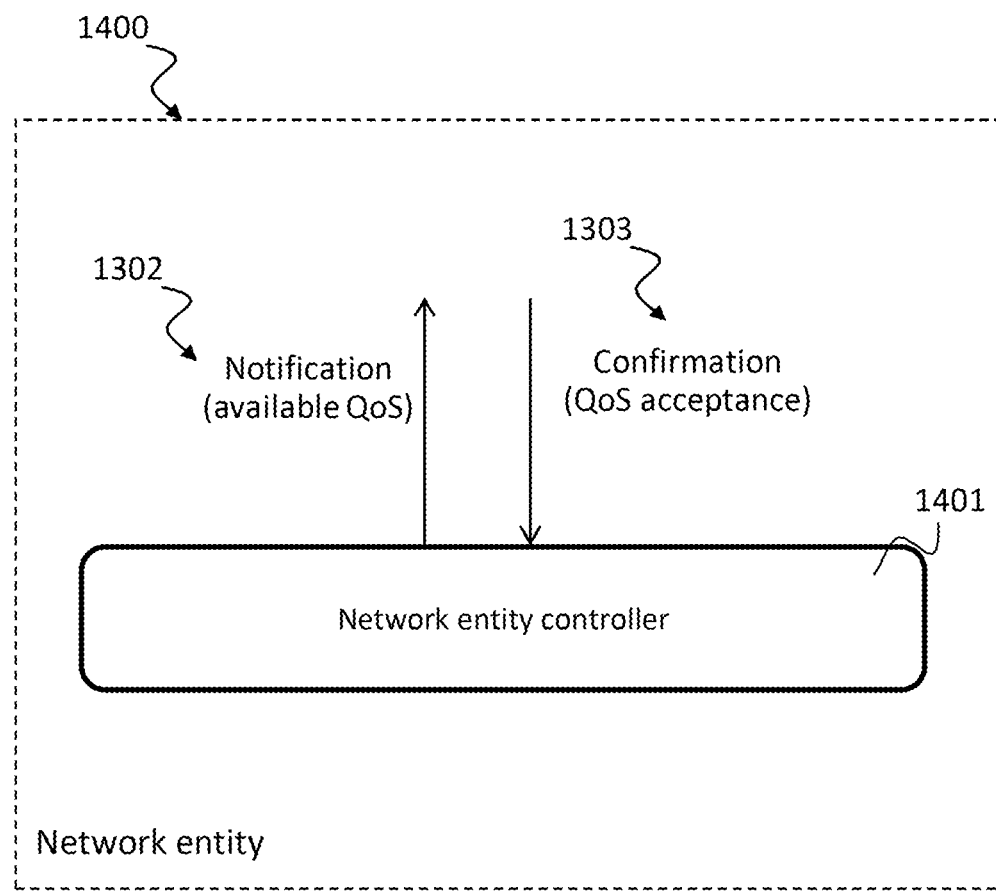
FIG. 14 shows a block diagram illustrating an exemplary network entity 1400 negotiating QoS with a mobile device or an application server according to the disclosure.

FIG. 14 shows a block diagram illustrating an exemplary network entity 1400 negotiating QoS with a mobile device or an application server according to the disclosure. The network entity 1400 may be for example a CN-F 330 as described above with respect to FIGS. 3 to 12. The network entity 1400 includes a network entity controller 1401 for performing control tasks.

The network entity controller 1401 is configured to transmit a notification, e.g. a notification 1302 as described above with respect to FIG. 13, to a mobile device 1300, 310, in particular a vehicle, or an application server 1300, 1014, e.g. as described above with respect to FIG. 13. The notification 1302 comprises information about available Quality of Service, QoS. The network entity controller 1401 is configured to receive a confirmation message, e.g. a confirmation message 1303 as described above with respect to FIG. 13, from the mobile device 1300, 310 or the application server 1300, 1014 informing about an acceptance of the notified QoS.

The mobile device 1300 can be a vehicle, e.g. a vehicle 100, 201, 202 as described above with respect to FIGS. 1 and 2. The mobile device 1300 can be a user equipment (UE) 310 as described above with respect to FIGS. 3 to 12, e.g. a user equipment 310 arranged in a vehicle 100, 201, 202 as described above with respect to FIGS. 1 and 2.

The network entity controller 1401 may transmit the notification 1302 upon request and/or pro-actively, in particular based on a prediction of a change in radio conditions. The network entity controller 1401 may allocate resources related to a specific QoS to the mobile device 1300, 310 or the application server 1300, 1014 upon acceptance of the notified QoS.

The network entity controller 1401 may be configured to transmit the notification 1302 to a group of vehicles or an application server, e.g. as described above with respect to FIGS. 3 to 12. The network entity controller 1401 may be configured to allocate the resources related to the specific QoS to the group of vehicles if the network entity controller 1401 receives respective confirmation messages 1303 from all vehicles of the group of vehicles, e.g. as described above with respect to FIGS. 3 to 12. The network entity controller 1401 may be configured to monitor the QoS of an established vehicle-to-everything, V2X, service.

Figure 15:
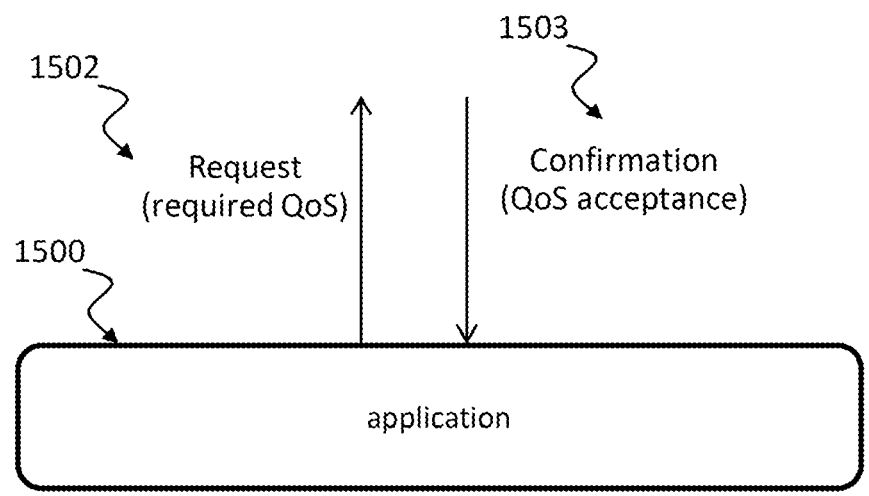
FIG. 15 shows a block diagram illustrating an exemplary application 1500 for requesting a required QoS according to the disclosure.

FIG. 15 shows a block diagram illustrating an exemplary application 1500 for requesting a required QoS according to the disclosure. The application may be a software program and/or function running on a mobile device or an application server, e.g. a mobile device 1300, 310 described above with respect to FIGS. 3 to 14 or an application server 1300, 1014 described above with respect to FIGS. 3 to 14. Alternatively, the application 1500 may be a hardware circuit or circuitry implementing the function of the application as described in this disclosure. The mobile device 1300 can be a vehicle, e.g. a vehicle 100, 201, 202 as described above with respect to FIGS. 1 and 2. The mobile device 1300 can be a user equipment (UE) 310 as described above with respect to FIGS. 3 to 12, e.g. a user equipment 310 arranged in a vehicle 100, 201, 202 as described above with respect to FIGS. 1 and 2.

The application 1500 is configured to transmit a request 1502 to a mobile device 1300, 310, in particular a vehicle or an application server 1300, 1014. The request 1502 comprises information about required Quality of Service, QoS. The application 1500 is configured to receive a confirmation message 1503 about an acceptance of the notified QoS from the mobile device 1300, 310 or the application server 1300, 1014, e.g. as described above with respect to FIGS. 3 to 14.

The application 1500 may receive a notification message that indicates an available QoS, e.g. as described above with respect to FIGS. 3 to 14. The application 1500 may select the available QoS and, in particular, confirm 1503 the selection to the mobile device 1300, 310 and/or to the application server 1300, 1014, e.g. as described above with respect to FIGS. 3 to 14.

The application 1500 may receive a single available QoS or a list of available QoS from a mobile device 1300, 310, in particular a vehicle, or from an application server 1300, 1014, e.g. as described above with respect to FIGS. 3 to 14. The application 1500 may be configured to transmit a response to the mobile device 1300, 310 or the application server 1300, 1014 to approve the single available QoS or to select one QoS from the list of available QoS.

The application 1500 may transmit the request 1502 based on information about a target communication service of the mobile device 1300, 310. Such target communication service may be related to a group of vehicles, e.g. as described above with respect to FIGS. 1 to 14. The target communication service may comprise a vehicle-to-everything, V2X, service, in particular one of the services: platooning, cooperative collision avoidance, cooperative sensing, e.g. as described above with respect to FIGS. 1 to 14. The request may comprise a list of candidate QoS.

Figure 16:
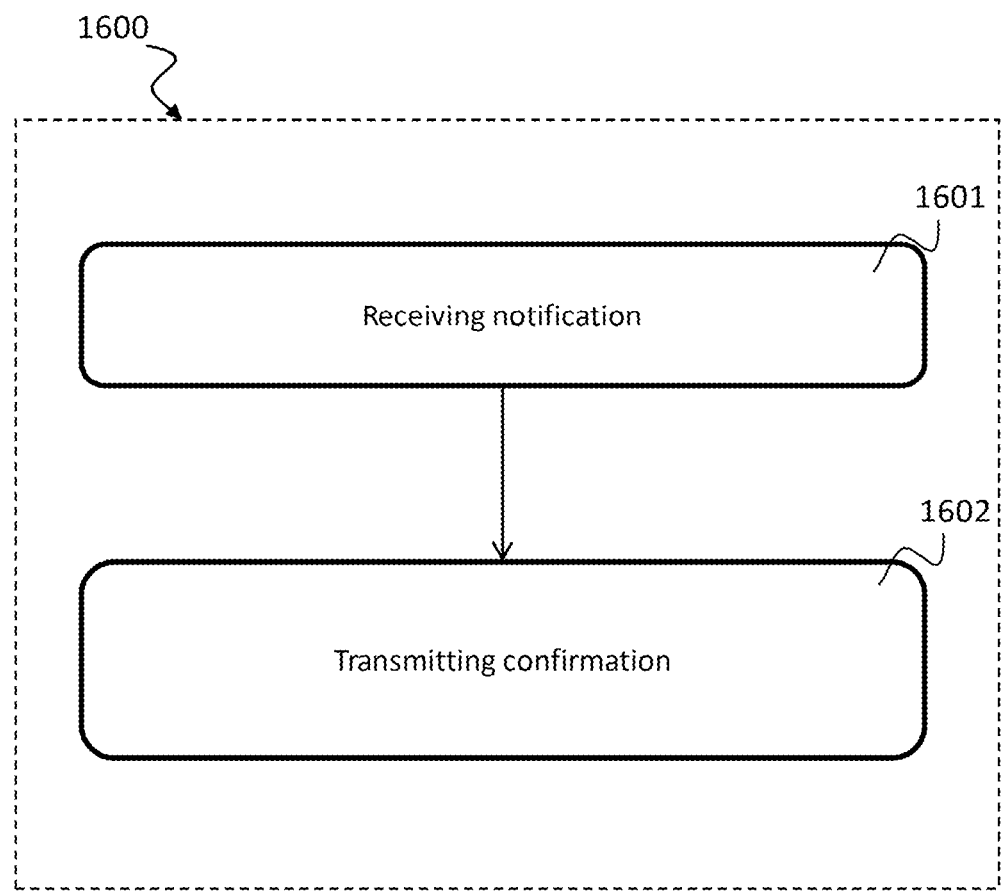
FIG. 16 shows a schematic diagram illustrating an exemplary method 1600 for negotiating QoS according to the disclosure.

FIG. 16 shows a schematic diagram illustrating an exemplary method 1600 for negotiating QoS according to the disclosure. The method may be implemented on a mobile device or an application server, e.g. a mobile device 1300 or an application server 1300 as described above with respect to FIG. 13. The mobile device 1300 can be a vehicle, e.g. a vehicle 100, 201, 202 as described above with respect to FIGS. 1 and 2. The mobile device 1300 can be a user equipment (UE) 310 as described above with respect to FIGS. 3 to 12, e.g. a user equipment 310 arranged in a vehicle 100, 201, 202 as described above with respect to FIGS. 1 and 2. The application server 1300 can be a V2X application server 1014 as described above with respect to FIGS. 10 and 11.

The method 1600 includes receiving 1601 a notification from a network entity 1400, in particular a base station, wherein the notification comprises information about available Quality of Service, QoS, e.g. as described above with respect to FIG. 13.

The method 1600 includes transmitting 1602 a confirmation message to the network entity 1400 informing the network entity 1400 about an acceptance of the notified QoS, e.g. as described above with respect to FIGS. 3 to 12.

The presented solution is based on a unique signaling in the radio interface, N2 interface and Xn interfaces which involves exchange of new messages; messages that are already available are enhanced with new content as well. Additionally the interactions among the different network entities (user equipment, BSs, Mobility Management) involve unique messages exchanges and introduction of new network functions. All the afore-mentioned messages and entities are targeting standardization.

The present disclosure also supports a computer program product including computer executable code or computer executable instructions that, when executed, causes at least one computer to execute the performing and computing steps described herein, in particular the steps of the method described above. Such a computer program product may include a readable non-transitory storage medium storing program code thereon for use by a computer. The program code may perform the processing and computing steps described herein, in particular the method described above.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. A mobile device or an application server comprising a processor configured to:
   send to a core network entity a request including a list of quality of service (QOS) classes during a current bearer supporting communications between the core network entity and the mobile device or the application server,
      wherein each QoS class in the list is associated with a level of QoS for a next bearer for supporting communications between the core network entity and the mobile device or the application server, and
      wherein each QoS class in the list defines parameters supporting a target vehicle-to-anything (V2X) service; and
   receive a notification from the core network entity during the current bearer supporting communications between the core network entity and mobile device or application server,
      wherein the notification comprises at least one QoS class from the list of QoS classes that can be allocated to support the target V2X service during establishment of the next bearer.

2. The mobile device or the application server according to claim 1, wherein the processor is configured to send a confirmation message to the core network entity informing the core network entity about an acceptance of the at least one QoS class.

3. The mobile device or the application server according to claim 1, wherein each of the current and next bearer is a radio bearer.

4. The mobile device or the application server according to claim 1, wherein the notification comprises information about available resources supporting another QoS class.

5. A core network entity comprising a core network entity controller configured to:
   receive, from a mobile device or an application server, a request comprising a list of quality of service (QOS) classes,
      wherein the request is received during a current bearer supporting communications between the core network entity and the mobile device or application server,
      wherein each QoS class is associated with a level of QoS and each QoS class defines parameters that support a target V2X service;
   send a notification to the mobile device or the application server during the current bearer,
   wherein the notification comprises at least one QoS class from the list of QoS classes that can be allocated during establishment of a next bearer.

6. The core network entity according to claim 5, wherein the core network entity controller is further configured to receive a confirmation from the mobile device or the application server informing about an acceptance of the notified QoS.

7. The core network entity according to claim 5, wherein the core network entity controller is configured to send the notification upon request or pro-actively.

8. The core network entity according to claim 5, wherein the core network entity controller is further configured to:
   send the notification to a group of vehicles comprising the mobile device or the application server; and
   allocate resources related to a QOS to the group of vehicles based upon the core network entity controller receiving respective confirmation messages from all vehicles of the group of vehicles.

9. A non-transitory computer readable medium comprising instructions for execution by a processor that, when executed by the processor, configure the processor to negotiate a quality of service (QOS) with a mobile device or an application server, the method comprising:
   sending to a core network entity a request including a list of QOS classes during a current bearer supporting communications between the core network entity and the mobile device or the application server,
      wherein each QoS class in the list is associated with a level of QoS for a next bearer for supporting communications between the core network entity and the mobile device or the application server, and
      wherein each QoS class in the list defines parameters supporting a target vehicle-to-anything (V2X) service; and
   receiving a notification from the core network entity during the current bearer supporting communications between the core network entity and mobile device or application server,
   wherein the notification comprises at least one QoS class from the list of QoS classes that can be allocated to support the target V2X service during establishment of the next bearer.

10. The non-transitory computer readable medium according to claim 9 comprising further instructions for execution by the processor, that when executed by the processor, configure the processor to send a candidate request to the mobile device or the application server, wherein the candidate request comprises the list of candidate QoS classes, and
   wherein the application server is configured to receive an availability notification that indicates an available QoS class.

11. The non-transitory computer readable medium according to claim 10 further comprising instructions for execution by the processor, that when executed by the processor, configures the processor to select the available QoS and confirm the selection to the mobile device or to the application server.

12. The non-transitory computer readable medium according to claim 10 further comprising instructions for execution by the processor, that when executed by the processor, configure the processor to receive a single available QoS or a set of available QoS from the mobile device or from the application server and to send a response to the mobile device or the application server to approve the single available QoS or to select one QoS from the set of available QoS.

13. The non-transitory computer readable medium according to claim 10 further comprising instructions for execution by the processor, that when executed by the processor, configure the processor to send the candidate request based on information about a target communication service of the mobile device, and wherein the target communication service is related to a group of vehicles.

14. A core network entity comprising a processor, wherein the processor is configured to:
   send to another core network entity a request comprising a list of quality of service (QOS) classes during a current bearer supporting communications between the core network entity and the other core network entity,
      wherein each QoS class in the list defines parameters supports a target vehicle-to-anything (V2X) service and a radio resource control (RRC) context, and
      wherein each QoS class in the list is associated with a level of QoS for a next bearer for supporting communications between the core network entity and the other core network entity;
receive a notification from the other core network entity during the current bearer supporting communications between the core network entity and the other core network entity,
wherein the notification comprises a next available supported QoS class in the list, and an admitted set of radio bearers; and
wherein the notification comprises at least one QoS class from the list of QoS classes that can be allocated to support the target V2X service during establishment of the next bearer.

15. The core network entity according to claim 14, wherein the processor is further configured to receive a confirmation from a mobile device or a application server informing about an acceptance of the at least one QoS class.

16. The core network entity according to claim 14, wherein the processor is further configured to send the notification upon request or pro-actively.

17. The core network entity according to claim 14, wherein the processor is further configured to:
send the notification to a group of mobile devices or application servers; and
allocate resources related to a QoS to the group of mobile devices or application servers based on the processor receiving respective confirmation messages from all mobile devices or all application servers of the group.

* * * * *